United States Patent
Peddada et al.

(10) Patent No.: US 11,157,630 B2
(45) Date of Patent: Oct. 26, 2021

(54) MIGRATING DATA BETWEEN DATABASES

(71) Applicant: salesforce.com, inc., San Francisco, CA (US)

(72) Inventors: Prasad Peddada, Alameda, CA (US); Taher ElGamal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 298 days.

(21) Appl. No.: 15/972,397

(22) Filed: May 7, 2018

(65) Prior Publication Data

US 2019/0340251 A1    Nov. 7, 2019

(51) Int. Cl.
*H04L 29/06*  (2006.01)
*G06F 21/60*  (2013.01)
*H04L 9/14*  (2006.01)
*H04L 9/30*  (2006.01)
*H04L 9/08*  (2006.01)
*G06F 16/21*  (2019.01)

(52) U.S. Cl.
CPC .......... *G06F 21/602* (2013.01); *G06F 16/214* (2019.01); *H04L 9/0822* (2013.01); *H04L 9/0861* (2013.01); *H04L 9/14* (2013.01); *H04L 9/30* (2013.01)

(58) Field of Classification Search
CPC . H04L 9/14; H04L 9/30; H04L 9/0861; H04L 9/0822; G06F 21/602; G06F 16/214
See application file for complete search history.

(56) References Cited

U.S. PATENT DOCUMENTS

| | | | | |
|---|---|---|---|---|
| 9,582,524 B1* | 2/2017 | Murali | ................. | G06F 16/214 |
| 9,785,645 B1* | 10/2017 | Chen | ................. | G06F 16/211 |
| 9,805,071 B1* | 10/2017 | Ellis | ................. | G06F 16/214 |
| 2002/0083071 A1* | 6/2002 | Crapo | ................. | G06F 16/213 |
| 2004/0117375 A1* | 6/2004 | Saha | ................. | H04L 49/90 |
| 2005/0021984 A1* | 1/2005 | Hollander | ............ | H04L 9/0866 |
| | | | | 713/186 |
| 2006/0047481 A1* | 3/2006 | Kanai | ................. | H04L 63/105 |
| | | | | 702/184 |
| 2006/0074916 A1* | 4/2006 | Beary | ................. | G06F 16/214 |
| 2006/0235899 A1* | 10/2006 | Tucker | ................. | G06F 16/214 |
| 2009/0077114 A1* | 3/2009 | Zachariah | ............ | G06F 16/258 |

(Continued)

*Primary Examiner* — Sher A Khan
(74) *Attorney, Agent, or Firm* — Holland & Hart LLP

(57) ABSTRACT

Methods, systems, and devices for data migration are described. In a system, databases may utilize different database-specific encryption keys for storage security. In some cases, the system may migrate data from a source database to a target database. To securely migrate the data, the source database may generate a temporary encryption key. The source database may decrypt the data using its database-specific key and may re-encrypt the data using this temporary encryption key. Additionally, the source database may wrap the temporary key with a public key corresponding to the target database. The source database may send the re-encrypted data and the wrapped temporary key to the target database. The target database may unwrap the temporary key using a private key associated with the public key and may decrypt the data using the temporary key before re-encrypting the data with its database-specific key for data storage.

16 Claims, 15 Drawing Sheets

(56) References Cited

U.S. PATENT DOCUMENTS

| | | | | |
|---|---|---|---|---|
| 2009/0222691 A1* | 9/2009 | Riemers | G06F 16/214 | 714/18 |
| 2013/0110770 A1* | 5/2013 | Stevelinck | G06F 16/214 | 707/609 |
| 2013/0173547 A1* | 7/2013 | Cline | G06F 16/178 | 707/638 |
| 2014/0236901 A1* | 8/2014 | Hirose | G06F 16/119 | 707/654 |
| 2014/0379635 A1* | 12/2014 | Sanford | G06F 3/0647 | 707/609 |
| 2015/0012665 A1* | 1/2015 | Kang | G06F 9/45558 | 709/245 |
| 2015/0019488 A1* | 1/2015 | Higginson | G06F 16/214 | 707/634 |
| 2015/0058289 A1* | 2/2015 | Do | G06F 16/2386 | 707/613 |
| 2015/0242273 A1* | 8/2015 | Resch | G06F 21/62 | 714/763 |
| 2015/0254257 A1* | 9/2015 | Kritchko | G06F 16/214 | 707/634 |
| 2016/0063050 A1* | 3/2016 | Schoen | G06F 16/214 | 707/690 |
| 2016/0140116 A1* | 5/2016 | Li | G06F 16/214 | 707/609 |
| 2016/0246821 A1* | 8/2016 | Meder | G06F 16/214 | |
| 2017/0024382 A1* | 1/2017 | Bester | G06F 16/2282 | |
| 2017/0046373 A1* | 2/2017 | Baker | G06F 16/23 | |
| 2017/0061027 A1* | 3/2017 | Chesla | G06F 16/955 | |
| 2018/0241561 A1* | 8/2018 | Albertson | H04L 9/0891 | |
| 2018/0246886 A1* | 8/2018 | Dragomirescu | G06F 16/214 | |
| 2018/0262339 A1* | 9/2018 | Kazin | H04L 9/006 | |
| 2019/0108223 A1* | 4/2019 | Fabijancic | G06F 16/212 | |
| 2019/0272381 A1* | 9/2019 | Yoon, II | G06F 21/60 | |

* cited by examiner

MIGRATING DATA BETWEEN DATABASES

FIELD OF TECHNOLOGY

The present disclosure relates generally to database systems and data processing, and more specifically to migrating data between databases.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may be supported by a database system. Within the database system, one or more databases may support storing encrypted data records at rest for one or more tenants. In some cases, the database system may migrate the data for a tenant from one database to another within the system. However, to securely migrate this data between databases, the data records may not be transmitted as plaintext. In order to securely migrate the data (e.g., as ciphertext), some database systems utilize a global encryption key across all databases within the database system. In this way, the target database may decrypt the data records it receives from the source database, as both use a same encryption key. However, utilizing a global encryption key across a database system may introduce other security risks (e.g., if any one of the users and/or databases is attacked by a malicious user and the global encryption key is stolen, the data at every database in the system is compromised). Additionally, maintaining up-to-date encryption across a large number of databases when rotating a single global encryption key may not be practical.

DETAILED DESCRIPTION

Figure 1:
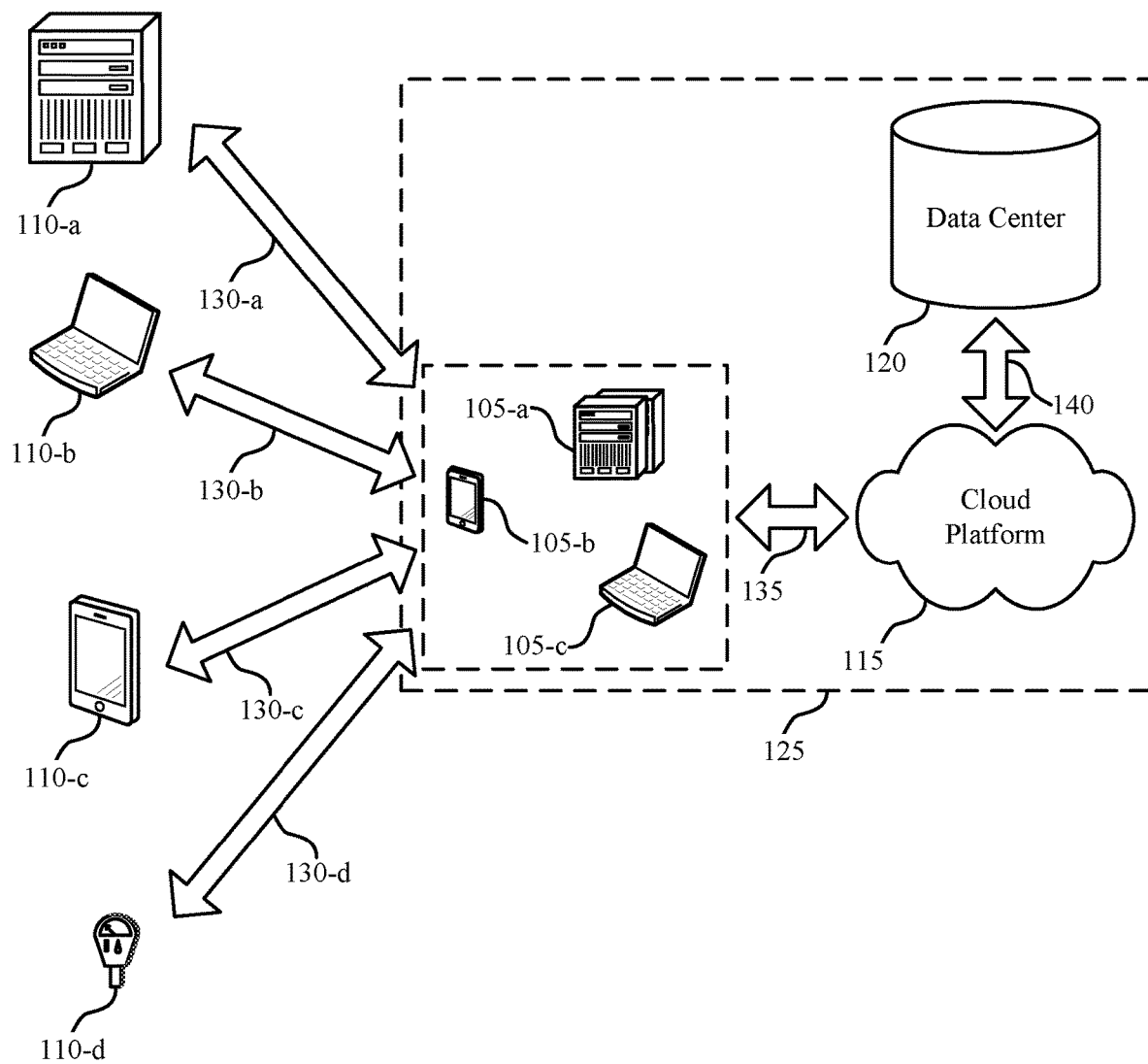
FIG. 1 illustrates an example of a system for data migration that supports migrating data between databases in accordance with aspects of the present disclosure.

Some database systems may support encryption of data records at rest. To increase security of stored information, one or more databases may store data records as ciphertext, rather than plaintext. In a small database system, each database may utilize a same global encryption key to encrypt the data records as ciphertext. As such, when migrating data records from a source database to a target database, the global encryption key may be used to securely transfer the data records, where both the source and target databases know the global encryption key. However, using the global encryption key across multiple databases may compromise security for data records at each of the databases. For example, if one database or data migration procedure is attacked by a malicious user and the global encryption key is stolen (e.g., identified) by the malicious user, the data records for the entire database system may be compromised because the same global encryption key is used for encryption at every database. Even if the encryption key is not fully global, but is utilized by multiple databases within the database system, this encryption key strategy can increase the security risks for the stored data records.

To mitigate these security risks, each database may utilize a different encryption key for a more secure data storage system. However, the different encryption keys may complicate data migrations because each database may not know the encryption key at the other databases (e.g., if database-specific keys are kept local to each database as part of the secure data storage system). If a target database cannot determine the encryption key for a source database, the target database may be unable to decrypt a set of data records encrypted with this encryption key. In large database systems, different databases may be located at different physical locations for storing data records, and each database may utilize a database-specific encryption key for storage security. In the cases of multi-tenant database systems, these databases may store data for one or more tenants. Data for each tenant may be constrained to a single database, or may span multiple databases (e.g., based on the size of the tenant, the database, the database system, etc.).

In some cases, the system may migrate certain data (e.g., tenant-specific data) from a source database to a target database. However, for security reasons, the databases should not send any indication of their database-specific encryption keys to other databases, nor should the data be transmitted in an unencrypted state. To securely migrate the data while keeping the database-specific encryption keys local and secure, the source database may generate a temporary encryption key for the migration process. The source database may first decrypt the data using a corresponding first database-specific key, and may re-encrypt the data using the generated temporary encryption key. Additionally, the source database may identify a public key associated with a private key at the target database and may wrap the temporary encryption key with this public key. The source database may then send the re-encrypted data and the wrapped temporary encryption key to the target database. The target database may unwrap the temporary encryption key using its private key and may decrypt the data using the temporary encryption key before re-encrypting the data with a corresponding second database-specific key for storing the data at rest. In this way, the migrated data and the database-specific encryption keys may be handled in a secure manner throughout the data migration process.

Additionally, the source database may migrate data records to multiple target databases. For example, the source database may migrate the entire set of data records to each of the multiple target databases. Alternatively, the source database may migrate a first subset of the data records to a first target database, a second subset of data records to a second target database, etc. Accordingly, the same temporary encryption key may be used or different temporary encryption keys may be generated for migrating the data records to each target database. In some cases, different temporary encryption keys (e.g., unique tenant secrets) may be implemented for data belonging to different tenants. A different public key may be used to wrap each temporary encryption key for the data migration, where the different public keys correspond to each target database based on a database-public key correlation.

Aspects of the disclosure are initially described in the context of an environment supporting an on-demand database service. Additional aspects of the disclosure are then described through an encryption process, an encrypted data migration, a data migration to multiple databases, and a process flow. Aspects of the disclosure are further illustrated by and described with reference to apparatus diagrams, system diagrams, and flowcharts that relate to migrating data between databases.

FIG. 1 illustrates an example of a system 100 for data migration that supports migrating data between databases in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-$a$), a smartphone (e.g., cloud client 105-$b$), or a laptop (e.g., cloud client 105-$c$). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-$a$, 130-$b$, 130-$c$, and 130-$d$). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-$a$), a laptop (e.g., contact 110-$b$), a smartphone (e.g., contact 110-$c$), or a sensor (e.g., contact 110-$d$). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may include one or more databases that support encryption at rest for stored data records or data objects. A cloud client 105 (e.g., a tenant or customer) may select an encryption policy for data stored in the database for that cloud client 105. For example, in some cases, the cloud client 105 may select specific data records or data record types to be stored as plaintext or ciphertext, select an encryption key or key management policy (e.g., specifying a key rotation policy indicating one or more triggers or periodicities for rotating the encryption key), or select an encryption scheme (e.g., probabilistic encryption, deterministic encryption, etc.). Additionally or alternatively, each database in the data center 120 may use a respective database-specific encryption key for encrypting and securely storing data records (e.g., across all tenants of that database). To enhance security, these database-specific keys may remain internal (i.e., local) to the database or to an associated database server and, as such, each database may not be able to determine the respective database-specific encryption keys for the other databases in the data center 120.

Upon receiving a migration request (e.g., from a cloud client 105 or through automation based on a predetermined criteria), a first database (e.g., the source database) may migrate one or more data records to a second database (e.g., the target database). For example, a cloud client 105 may select to migrate data from the first database to the second database based on a higher processing power or system speed of the second database compared to the first database, in order to move the physical data storage closer geographically to one or more users of the cloud client 105, for compliance reasons, to alleviate data storage constraints at the first database, or a combination thereof, and may accordingly transmit the migration request to the first database. In order to securely migrate the data while keeping database-specific encryption keys local and secure for each database, the first database may generate a temporary encryption key for the migration process. The first database may first decrypt the data using its database-specific key and may re-encrypt the data using this temporary encryption key. Additionally, the first database may identify a public key associated with a private key at the second database and may wrap the temporary encryption key with this public key. The first database may then send the re-encrypted data and the wrapped temporary encryption key to the second database. Subsequently, the second database may unwrap the temporary encryption key using its private key corresponding to the public key used for the key wrapping, and may decrypt the data using the temporary encryption key before re-encrypting the data with its own database-specific encryption key to securely store the data at rest. In some cases, if the data migration is determined to be successful, the migrated data records stored at rest at the first database may be deleted.

Conventional systems may fail to securely transport data during data migration, or may fail to securely maintain database-specific encryption keys. In a first example, databases within a database system may utilize database-specific or tenant-specific encryption keys for storing data. In this example, the databases may decrypt any data records prior to migration, and may transmit the data unencrypted for the data migration process. This allows for data migration with different encryption keys used at each database, but the data is not secure during the migration procedure, and as such can be obtained or corrupted by a malicious third party. In a second example, a global encryption key may be used by each database in the data center 120. As such, data records for each tenant with data records in the data center 120 may be encrypted and stored using the same global encryption key. When migrating data between databases, the databases may simply transmit the data records encrypted with the global encryption key (e.g., where the transmitted ciphertext is the same ciphertext that is stored by the databases). However, the global encryption key may diminish security for the data records across all of the databases. For example, if one tenant is attacked by a malicious user (e.g., during a data migration, or when the data is stored at rest) and the malicious user identifies the global encryption key, the data records across all of the databases (e.g., for all of the tenants) in the data center 120 may be compromised, since this same global encryption key is used to encrypt all data records in the database system.

The system 100 may support secure data migrations using database-specific encryption keys. For example, by generating and using a temporary encryption key for the data migration, the database-specific encryption keys may be maintained locally at each database while still providing a secure data transfer. For example, the databases may not send any indication of their database-specific encryption keys to the other databases, but the data can be securely transmitted in an encrypted state. If a malicious user were to gain access to an encryption key for a set of data records in the data center 120, the encrypted data records at the other databases of the data center 120 may not be compromised. Further, the public-private key used to wrap and unwrap the temporary encryption key may provide an additional layer of security in that the private key may be available solely through memory for a database, where cloud clients 105 do not have access to the private key. If a malicious third party were to intercept the data and temporary encryption key during the migration, the data may remain secure, as the third party may not be able to unwrap the temporary encryption key, and as such cannot decrypt the migrating data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
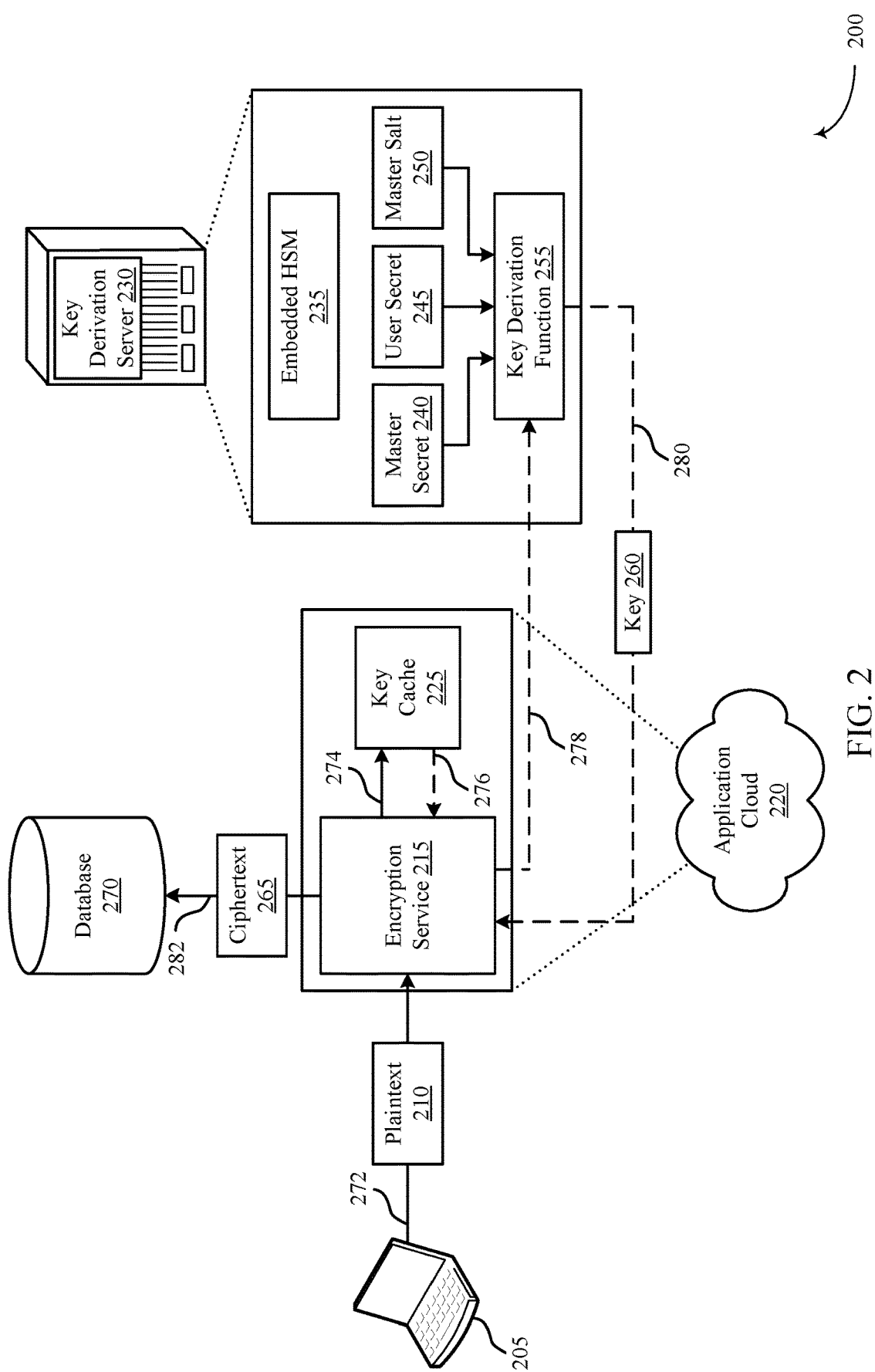
FIG. 2 illustrates an example of an encryption process that supports migrating data between databases in accordance with aspects of the present disclosure.

FIG. 2 illustrates an example of an encryption process 200 that supports migrating data between databases in accordance with various aspects of the present disclosure. Encryption process 200 may be initiated by a user device 205, which may be an example of a cloud client 105 or a contact 110 as described with reference to FIG. 1. User device 205 may send a data object to a database 270 to be stored. In some cases, the data object may include one or more plaintext data fields that are designated for encryption. The plaintext 210 may be encrypted in an application cloud 220 based on a key 260 generated by a key derivation server 230. In some cases, the key derivation functionality and the encryption service 215 functionality may be performed by a same database server. In some examples, database 270 and key derivation server 230 may be components of a data center 120 as described with reference to FIG. 1. Additionally or alternatively, key derivation server 230 may include a key derivation function 255. Encryption process 200 may convert plaintext 210 into ciphertext 265 and may store ciphertext 265 at database 270.

Database 270 may implement encryption to provide security for data at rest (i.e., data stored at database 270) and may not provide security for data being transmitted or received. In some cases, database 270 may additionally implement security for data being transmitted or received, such as transport layer security or message wrapping. In some cases, a user may turn encryption on or off and may specify the data for encryption. Some examples of data a user may select to encrypt include personally identifiable information (PII), sensitive, confidential, or proprietary data, or any other data that the user wants to stop unauthorized users from accessing in database 270. In some cases, the encrypted data may be a data field within a data object, a data file, or an attachment.

In some cases, encryption process 200 may incur a tradeoff between data security and functionality. For example, a user may run functions on data objects in application cloud 220. However, some of these functions may not be designed to run on encrypted data. Encryption process 200 may be an example of probabilistic encryption (i.e., non-deterministic encryption, such as strong symmetric non-deterministic encryption) or may be an example of deterministic encryption. In some cases, probabilistic encryption may support less functionality than deterministic encryption, but may provide better data security. In one example, encryption process 200 may be probabilistic encryption utilizing the Advanced Encryption Standard (AES) with 256-bit keys. Encryption process 200 may additionally use cipher block chaining (CBC), Galois/Counter Mode (GCM), public key cryptography standards (PKCS) for padding (e.g., PKCS #5), a random initialization vector (IV), or any combination thereof.

At 272, user device 205 may send a data object to database 270 for storage. The data object may first be sent to application cloud 220, which may include an encryption service 215 and a key cache 225. In some cases, encryption service 215 and key cache 225 may be components of a database server, which may be a component of a data center 120, as described with reference to FIG. 1. The data object sent to encryption service 215 may include a set of data fields (e.g., an organization identifier field, a name field, a phone number field, a price field, etc.). In some cases, one or more of the data fields may be designated for encryption. For example, a user may select to encrypt the name field. In some cases, the user may additionally select an encryption scheme (e.g., deterministic encryption or probabilistic encryption) for the data field. When the data object is received at encryption service 215, a runtime engine may determine whether the data object contains any data designated for encryption. Encryption service 215 may identify the name field, and may initiate encryption of plaintext 210 corresponding to the name field of the data object.

At 274, encryption service 215 may request an encryption key 260 from key cache 225. An encryption key 260 that was recently used may be stored in key cache 225, which may be an example of an application server cache. For example, when encryption service 215 encrypts data using encryption key 260, encryption service 215 may store encryption key 260 in key cache 225. Encryption key 260 may not persist in key cache 225. For example, key cache 225 may flush its storage or remove encryption key 260 based on a cache replacement algorithm (e.g., a least recently used (LRU) cache algorithm). Key cache 225 may identify whether it contains the active encryption key 260 corresponding to the data field to be encrypted (e.g., based on metadata associated with the data object or the data field). If key cache 225 identifies encryption key 260, key cache 225 may send encryption key 260 to encryption service 215 at 276. Otherwise, key cache 225 may send an indication to encryption service 215 that key cache 225 does not have encryption key 260. In some cases, key cache 225 may not send anything to encryption service 215, and encryption service 215 may determine to derive encryption key 260 based on not receiving a response from key cache 225.

At 278, encryption service 215 may send a derivation request to key derivation server 230 based on not receiving encryption key 260 from key cache 225. Key derivation server 230 may include one or more embedded hardware security modules (HSMs) 235, a master secret 240, a user secret 245, a master salt 250, or some combination of these components. Embedded HSMs 235 may be examples of computing devices used to secure and manage any encryption keys 260. Master secret 240 and master salt 250 may be generated periodically or aperiodically (e.g., at the start of each new software release). Master secret 240 may be generated based on a master HSM, which may be physically located at a different location than key derivation server 230. User secret 245 may be input by a user or generated on demand based on the embedded HSMs 235. Master secret 240, user secret 245, master salt 250, or any combination of these may be input into a key derivation function 255 (e.g., a password-based key derivation function 2 (PBKDF2)). Based on receiving the derivation request—and based on master secret 240, user secret 245, master salt 250, or a combination of these—key derivation function 255 may generate an encryption key 260. At 280, key derivation server 230 may send encryption key 260, which itself may be encrypted, to encryption service 215 or key cache 225.

Encryption service 215 may receive encryption key 260 (e.g., either from key cache 225 or key derivation server 230) and may use encryption key 260 (e.g., in some cases, along with a random IV) to encrypt plaintext 210 into ciphertext 265. Encryption service 215 may then store encryption key 260 in key cache 225. At 282, encryption service 215 may store the data object, including ciphertext 265 for the encrypted data field, in database 270, along with metadata associated with the data field. The associated metadata may include an indication that the data field contains ciphertext 265, an identifier of user secret 245 used to derive encryption key 260, and the random IV used for encryption.

In some cases, data already stored in database 270 may be selected for encryption, re-encryption, or decryption. For example, a user may select to turn encryption on for a data field, where one or more data objects stored in database 270 contain the data field. In other examples, the user or the database may rotate an encryption key 260 (e.g., generate a new active encryption key 260, and archive or revoke an existing encryption key 260) or switch an encryption scheme. In these cases, database 270 may send the data objects or plaintext 210 stored in the data field to application cloud 220 or a database server for encryption, re-encryption, or decryption. Database 270 may send batches of data objects or data fields (e.g., in portioned data chunks or record groups) for encryption, re-encryption, or decryption in order to reduce overhead associated with the encryption process at any one time. These encryption processes may run as a background job, and database 270 or application cloud 220 may limit the processing power or memory allocated for these encryption processes. In some cases, encryption may occur in database 270 or a data center rather than in application cloud 220.

As described above, encryption key 260 may be database-specific to database 270 (e.g., encryption key 260 may be an example of a database-specific encryption key 260), such that data records encrypted within database 270 are encrypted with encryption key 260. Additionally or alternatively, separate encryption keys may be generated for separate user devices associated with different tenants, where the separate encryption keys are still database-specific to each database. In either cases, for security reasons, different databases (e.g., including database 270) may not know the database-specific encryption keys for the other databases in a system. However, in some cases, user device 205 may request that data in database 270 be migrated to a second database, and, as such, when migrating the data, the second database may not be able to decrypt data that has been encrypted according to a database-specific encryption key 260 for database 270. Additionally or alternatively, the data migration may be requested or initiated through an automation procedure, where the automation procedure is based on a predetermined criteria (e.g., migrating the data based on a periodic schedule, when the amount of data exceeds a threshold, etc.).

In order to migrate the data using database-specific encryption keys at each database—while still ensuring the data is transferred securely as encrypted data—database 270 may decrypt the data according to its database-specific encryption key 260 and then generate a temporary encryption key to re-encrypt the data for the data migration. This temporary encryption key may be generated by a key derivation server 230 or by an application server (e.g., hosting the encryption service 215). Database 270 may transmit the temporary encryption key to the second database to enable the second database to be able to decrypt the data using the temporary encryption key. But in order to transmit the temporary encryption key securely with the data, database 270 may first wrap the temporary encryption key with a public key that corresponds to the second database based on a database-public key correlation. The second database may then use a private key associated with the public key (e.g., based on a public-private key pair) to unwrap the temporary encryption key and decrypt the data. Subsequently, the second database may then re-encrypt the data according to its database-specific encryption key and store the encrypted data at rest. In some cases, if the data migration is successful, the successfully migrated data may be deleted at database 270.

Figure 3:
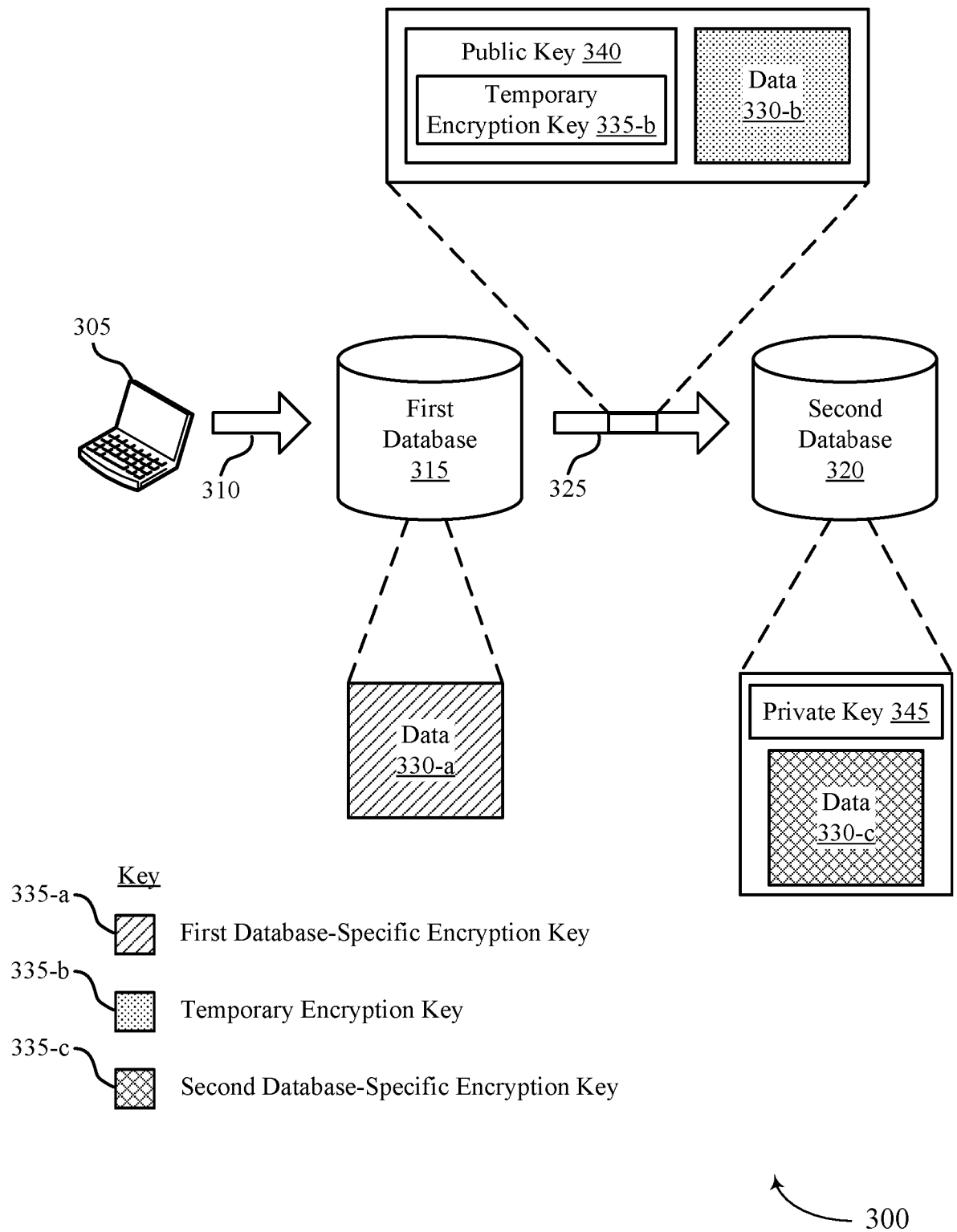
FIG. 3 illustrates an example of an encrypted data migration that supports migrating data between databases in accordance with aspects of the present disclosure.

FIG. 3 illustrates an example of an encrypted data migration 300 that supports migrating data between databases in accordance with various aspects of the present disclosure. As described above, encrypted data migration 300 may include migrating data from a first database 315 (e.g., a source database) to a second database 320 (e.g., a target database), where first database 315 and second database 320 may be examples of databases in one or more data centers 120 as described above with reference to FIG. 1 or databases 270 as described above with reference to FIG. 2. Additionally, each database may include a database-specific encryption key for encrypting and storing data at rest.

At 310, encrypted data migration 300 may be initiated by a user 305, which may be an example of a cloud client 105 or contact 110 as described with reference to FIG. 1 or a user device 205 as described with reference to FIG. 2. User 305 may be an example of an administrator of the database system, or may be a user 305 in charge of data storage for one or more tenants of the database system. In some cases, the encrypted data migration 300 may be tenant-specific. For example, user 305 may request the encrypted data migration 300 for a tenant based on a lack of storage space at first database 315, a closer proximity of second database 320 to users of the tenant, compliance reasons (e.g., data storage policies) at either database, or a combination thereof. Accordingly, the data migration request may indicate data 330-a stored at rest at first database 315 for the data migration, where data 330-a is a subset of data in first database 315 or is all of the data at first database 315. This data 330-a may belong to the indicated tenant if the encrypted data migration 300 is tenant-specific. Additionally or alternatively, the data migration from first database 315 to second database 320 may be initiated through automation based on a predetermined criteria. For example, the predetermined criteria may include a periodic schedule for migrating data (e.g., according to a number of days between data migrations), an amount of data exceeding a threshold at first database 315, or a similar criteria to prompt the data migration.

Based on the data migration request, first database 315 may initiate the data migration for data 330-a, where data 330-a is initially encrypted according to a first database-specific encryption key 335-a for first database 315. However, as described herein, first database-specific encryption key 335-a may be maintained locally at first database 315 for increased key security. Accordingly, second database 320 may not be able to identify first database-specific encryption key 335-a, so if data 330-a is transmitted to second database 320 still encrypted according to first database-specific encryption key 335-a, second database 320 may be unable to decrypt data 330-a. Accordingly, first database 315 may first generate a temporary encryption key 335-b (e.g., based on a key derivation procedure), decrypt data 330-a based on first database-specific encryption key 335-a, and then re-encrypt the data according to temporary encryption key 335-b. This temporary encryption key 335-b may be an example of a unique symmetric encryption key.

At 325, first database 315 may transmit the re-encrypted data 330-b according to temporary encryption key 335-b to second database 320. To enable second database 320 to decrypt data 330-b, first database 315 may further transmit temporary encryption key 335-b with data 330-b. To ensure that temporary encryption key 335-b is transmitted securely, first database may wrap it with a public key 340, where public key 340 corresponds to second database 320 (e.g., public key 340 is part of a public-private key pair, where the private key 345 of the pair is stored at second database 320). As such, second database 320 may have the private key 345 located in its memory that corresponds to public key 340 so that second database 320 may unwrap temporary encryption key 335-b from public key 340 using private key 345. In some examples, the private key 345 may not be stored in memory of second database 320, and instead may be stored in memory (e.g., random-access memory (RAM)) of an application server associated with database 320. If the private key 345 is flushed from the memory of the application server, the application server may re-derive the private key 345 (e.g., based on a key derivation function or a key derivation server). In some cases, the public and private key pair may correspond to a Rivest-Shamir-Adleman (RSA) encryption system, an ElGamal encryption system, or any other public-key encryption system.

After unwrapping temporary encryption key 335-b, second database 320 may decrypt data 330-b using the temporary encryption key 335-b, and may then re-encrypt the data according to a second database-specific encryption key 335-c associated with second database 320. Once re-encrypted, second database 320 may store data 330-c at rest. In some cases, based on the data migration being successful, second database 320 may transmit a confirmation message to first database 315. Consequently, first database 315 may then delete data 330-a based on receiving the confirmation message. Although not shown with respect to encrypted data migration 300, the requested data migration may include migrating data from first database 315 to multiple additional databases (e.g., one-to-many (1:M) migration).

Figure 4:
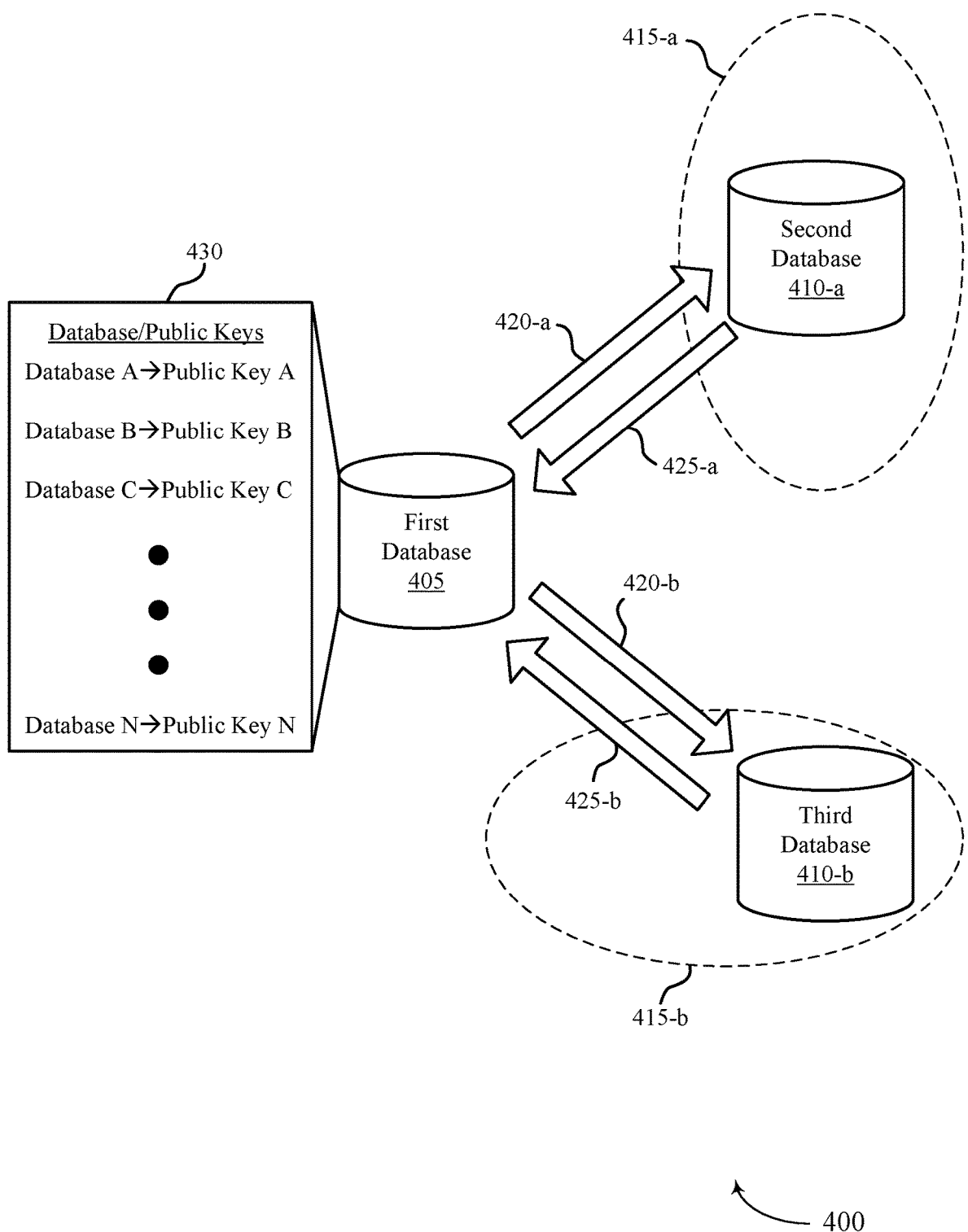
FIG. 4 illustrates an example of a multiple database data migration that supports migrating data between databases in accordance with aspects of the present disclosure.

FIG. 4 illustrates an example of a multiple database data migration 400 that supports migrating data between databases in accordance with various aspects of the present disclosure. Multiple database data migration 400 may implement aspects of encryption process 200 and encrypted data migration 300 as described above. As described herein, multiple database data migration 400 may include migrating data from a first database 405 to multiple databases (e.g., a second database 410-a and a third database 410-b), where each database may be an example of a database in a data center 120 as described above with reference to FIG. 1, a database 270 as described above with reference to FIG. 2, or a first database 315 or second database 320 as described above with reference to FIG. 3. Additionally, each database may utilize a separate database-specific encryption key as described above with reference to FIG. 3. For example, first database 405 may utilize a first database-specific encryption key, second database 410-a may utilize a second database-specific encryption key, and third database 410-b may utilize a third database-specific encryption key.

As described above, a user device may request or an automation procedure may initiate a data migration from first database 405 to second database 410-a and to third database 410-b. In some cases, first database 405 may migrate the entire set of data to both second database 410-a and third database 410-b. Alternatively, first database 405 may migrate a first subset of the data to second database 410-a and a second subset of the data to third database 410-b. In some cases, these subsets of data may be separated by tenant. For example first database 405 may migrate data associated with a first set of tenants to second database 410-a and data associated with a second set of tenants to third database 410-b. The data migration from first database 405 to multiple databases 410 may be based on a geographic location 415 corresponding to each database 410. For example, geographic location 415-a of second database 410-a may include or be in close proximity to a first set of users associated with the first subset of the data, and geographic location 415-b of third database 410-b may include or be in close proximity to a second set of users associated with the second subset of the data. As such, the data migration request may indicate that the corresponding subsets of data are to be closer to their respective users. Additionally or alternatively, the data migration request may be based on storage space availabilities at each database and/or compliance reasons. For example, geographic location 415-a and geographic location 415-b may be compliant to different sets of data regulations, restrictions, or procedures.

After receiving the data migration request, first database 405 may generate one or more temporary encryption keys for migrating the data to the additional databases 410. In some cases, first database 405 may utilize the same temporary encryption key for migrating the data to both databases 410. Alternatively, first database 405 may generate and utilize separate temporary encryption keys for each additional database 410, or each different tenant associated with the migrating data. For example, the temporary encryption keys may be examples of unique tenant secrets, and may be generated on a tenant-by-tenant basis. In this way, if first database 405 migrates data for a first and a second tenant to second database 410-a and data for a third tenant to third database 410-b, first database 405 may generate three temporary encryption keys, and encrypts the data corresponding to each tenant with a different tenant-specific temporary encryption key (e.g., a unique tenant secret or identifier).

In any of the above cases, first database 405 may decrypt the data for migration using a database-specific encryption key. In some cases, data stored at first database 405 for different tenants may be stored using different tenant-specific encryption keys (e.g., based on tenant secrets). However, this ciphertext may still be database-specific, as data for these tenants may be stored at other databases 410 using different tenant-specific, database-specific encryption keys. First database 405 may decrypt the data using either a database-specific encryption key or one or more tenant-specific, database-specific keys, and may then encrypt the corresponding data for each additional database 410 with the corresponding temporary encryption key (e.g., the same or different keys). First database 405 may transmit the encrypted data along with the temporary encryption key in a first message 420. For example, first database 405 may transmit a first subset of data encrypted with a first temporary encryption key along with the first temporary encryption key to second database 410-a in first message 420-a and may transmit a second subset of data encrypted with a second temporary encryption key along with the second temporary encryption key to third database 410-b in first message 420-b.

To ensure that the temporary encryption key(s) are transmitted securely and not easily accessed by a malicious user, first database 405 may wrap each temporary encryption key with a public key that corresponds to each additional database 410. In some cases, first database 405 may determine each public key based on a database-public key correlation table 430. Database-public key correlation table 430 may be stored in the memory of first database 405 and may include N public keys that correspond to N additional databases 410. For example, second database 410-a may correspond to 'Database A' in database-public key correlation table 430 and, hence, 'Public Key A.' As such, first database 405 may utilize 'Public Key A' to wrap the temporary encryption key for second database 410-a in first message 420-a. The public keys in database-public key correlation table 430 may correspond to a private key at the corresponding additional database 410 that is paired with the public key. For example, second database 410-a may store a 'Private Key A' in memory that is part of a public-private key pair with 'Public Key A,' and third database 410-b may store a 'Private Key B' in memory that is part of a public-private key pair with 'Public Key B.' In some cases, the public and private key pairs may correspond to RSA encryption systems, ElGamal encryption systems, or any other private-key encryption systems. In some examples, the additional databases 410 may store database-public key correlation tables 430, and first database 405 may store a private key corresponding to first database 405. In this way, each database in the database system may store an indication of a public key corresponding to each of the other databases, but may store a single private key associated with itself.

Based on the paired private key in its memory, each additional database 410 may unwrap its corresponding temporary encryption key from the associated public key. The additional database 410 may then decrypt the data in first message 420 using this determined temporary encryption key. After decrypting the data according to the temporary encryption key, the additional database 410 may re-encrypt the data according to its database-specific encryption key and store the encrypted data at rest. If the data migration is successful, the additional database may transmit a confirmation message 425 to first database 405 indicating the successful data migration. In some cases, upon receiving confirmation message 425 (e.g., confirmation message 425-a or 425-b), first database 405 may delete the data stored in memory of first database 405 that was successfully migrated. In other cases, first database 405 may automatically delete the data during the migration procedure. For example, the data may be extracted for migration (e.g., removed from data storage at first database 405 when the data is decrypted for re-encryption and transmission).

Figure 5:
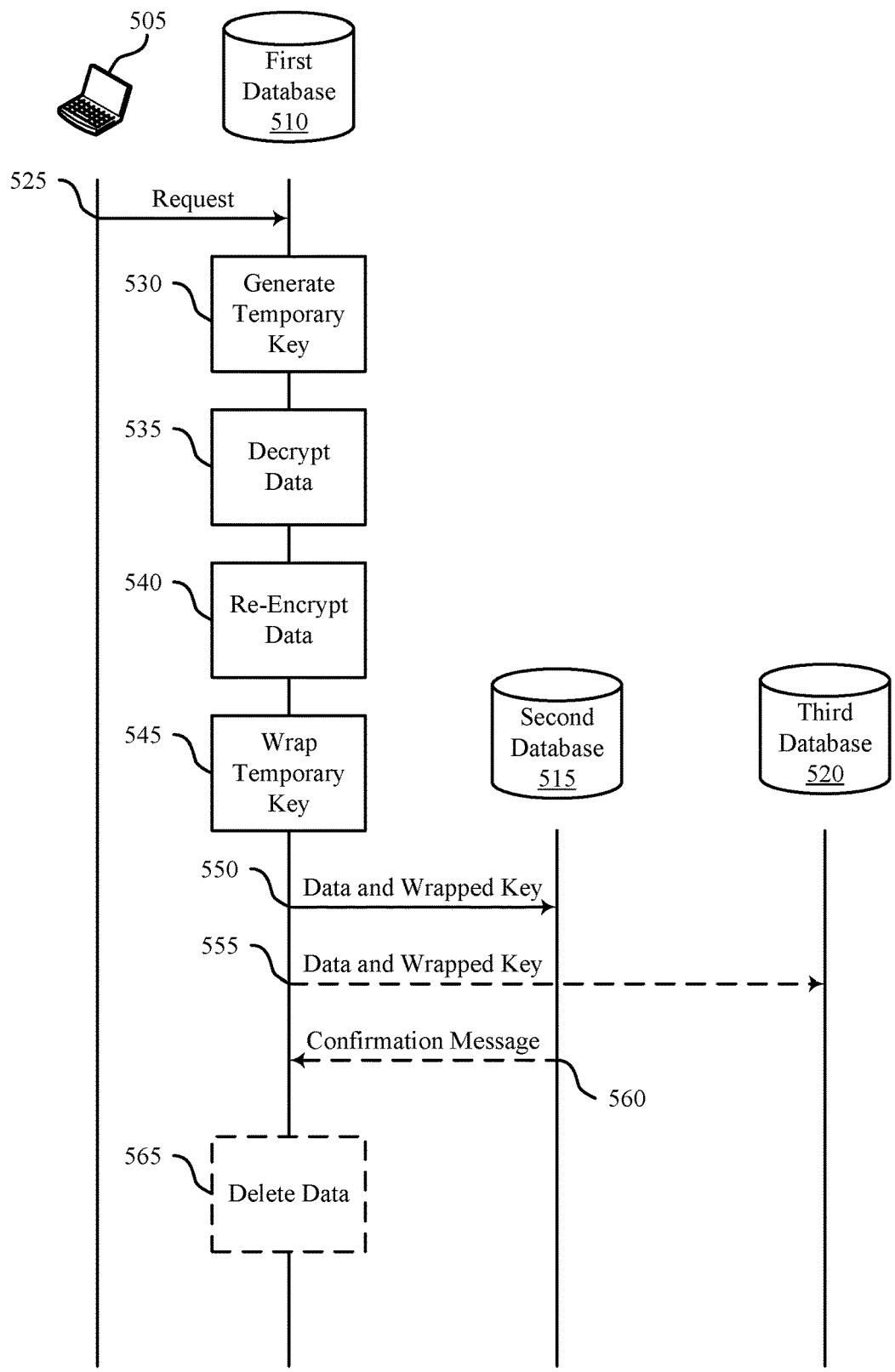
FIG. 5 illustrates an example of a process flow that supports migrating data between databases in accordance with aspects of the present disclosure.

FIG. 5 illustrates an example of a process flow 500 that supports migrating data between databases in accordance with various aspects of the present disclosure. Process flow may include a data migration from a first database 510 to a second database 515 and/or a third database 520, which may be examples of corresponding databases as described above with reference to FIGS. 1 through 4. Each database may be part of a multi-tenant database system servicing a user device 505, which may be operated by an administrative user or a tenant-specific user as described above with reference to FIGS. 1 through 4. For example, the administrative user may manage data storage across the database system, or the tenant-specific user may be an example of a data manager at an organization handling data storage for that tenant.

In the following description of the process flow 500, the operations between user device 505, first database 510, second database 515, and third database 520 may be performed in different orders or at different times. Certain operations may also be left out of the process flow 500, or other operations may be added to the process flow 500. It is to be understood that while first database 510 is shown performing a number of the operations of process flow 500, any corresponding device may perform the operations shown (e.g., an application server, database server, or server cluster associated with first database 510, an application cloud, etc.).

At 525, first database 510 may receive, from user device 505, a migration request to migrate data from first database 510 to second database 515, where first database 510 stores data at rest using a first database-specific encryption key and second database 515 stores data at rest using a second database-specific encryption key, where the second database-specific encryption key is different from the first database-specific encryption key. In some cases, the migration request may correspond to migrating data for a specific tenant (e.g., a tenant associated with the user operating user device 505) from first database 510 to second database 515. As described above, the migration request may be initiated through automation, where a predetermined technique for the automation initiates the data migration. Additionally, receiving the migration request may be based on an amount of data for the specific tenant, a geographic location of first database 510 or second database 515, a data storage policy for first database 510 or second database 515, or a combination thereof.

At 530, first database 510 may generate a temporary encryption key for migrating the data from first database 510 to second database 515. At 535, first database 510 may decrypt the data using the first database-specific encryption key. Subsequently, at 540, first database 510 may re-encrypt the data using the generated temporary encryption key.

At 545, first database 510 may wrap the temporary encryption key with a public key corresponding to second database 515. In some cases, first database 510 may identify second database 515 based on the migration request received at 525, and may determine the public key that corresponds to second database 515 based on a database-public key correlation (e.g., a database-public key correlation table) stored in memory of first database 510. The public key for second database 515 may be one half of a public-private key pair, where second database 515 has access to the private key of the pair.

At 550, first database 510 may transmit, to second database 515, the re-encrypted data and the wrapped temporary encryption key in response to the migration request. Consequently, second database 515 may unwrap the temporary encryption key using the private key of the public-private key pair, decrypt the encrypted data using the unwrapped temporary encryption key, re-encrypt the data using the second database-specific encryption key (e.g., specific to second database 515), and store the re-encrypted data at rest.

In some cases, the migration request may further indicate to migrate additional data from first database 510 to third database 520, where third database 520 stores data at rest using a third database-specific encryption key. For example, the migration request may specify to migrate data for a first tenant to second database 515 and migrate data for a second tenant to third database 520. Accordingly, first database 510 may decrypt the additional data using the first database-specific encryption key, re-encrypt the additional data using the same temporary encryption key, wrap the temporary encryption key with an additional public key for the third database, and, at 555, transmit, to third database 520, the re-encrypted additional data and the temporary encryption key wrapped with the additional public key in response to the migration request.

Alternatively, first database 510 may generate an additional temporary encryption key for migrating the additional data from first database 510 to third database 520, decrypt the additional data using the first database-specific encryption key, re-encrypt the additional data using the additional temporary encryption key, wrap the additional temporary encryption key with an additional public key for third database 520, and, at 555, transmit, to third database 520, the re-encrypted additional data and the wrapped additional temporary encryption key in response to the migration request. Third database 520 may unwrap the temporary encryption key, decrypt the data, and re-encrypt the data for storage using a third database-specific encryption key in much the same way as second database 515.

At 560, after receiving the re-encrypted data and the wrapped temporary encryption key at 550 and storing the re-encrypted data at rest, second database 515 may transmit, to first database 510, a confirmation message that the data migration is successful.

At 565, first database 510 may delete the data from its memory based on receiving the confirmation message at 560 from second database 515. In other cases, first database 510 may delete the data stored at rest using the first database-specific encryption key during the decryption process at 535 (e.g., as part of a data extraction process).

Figure 6:
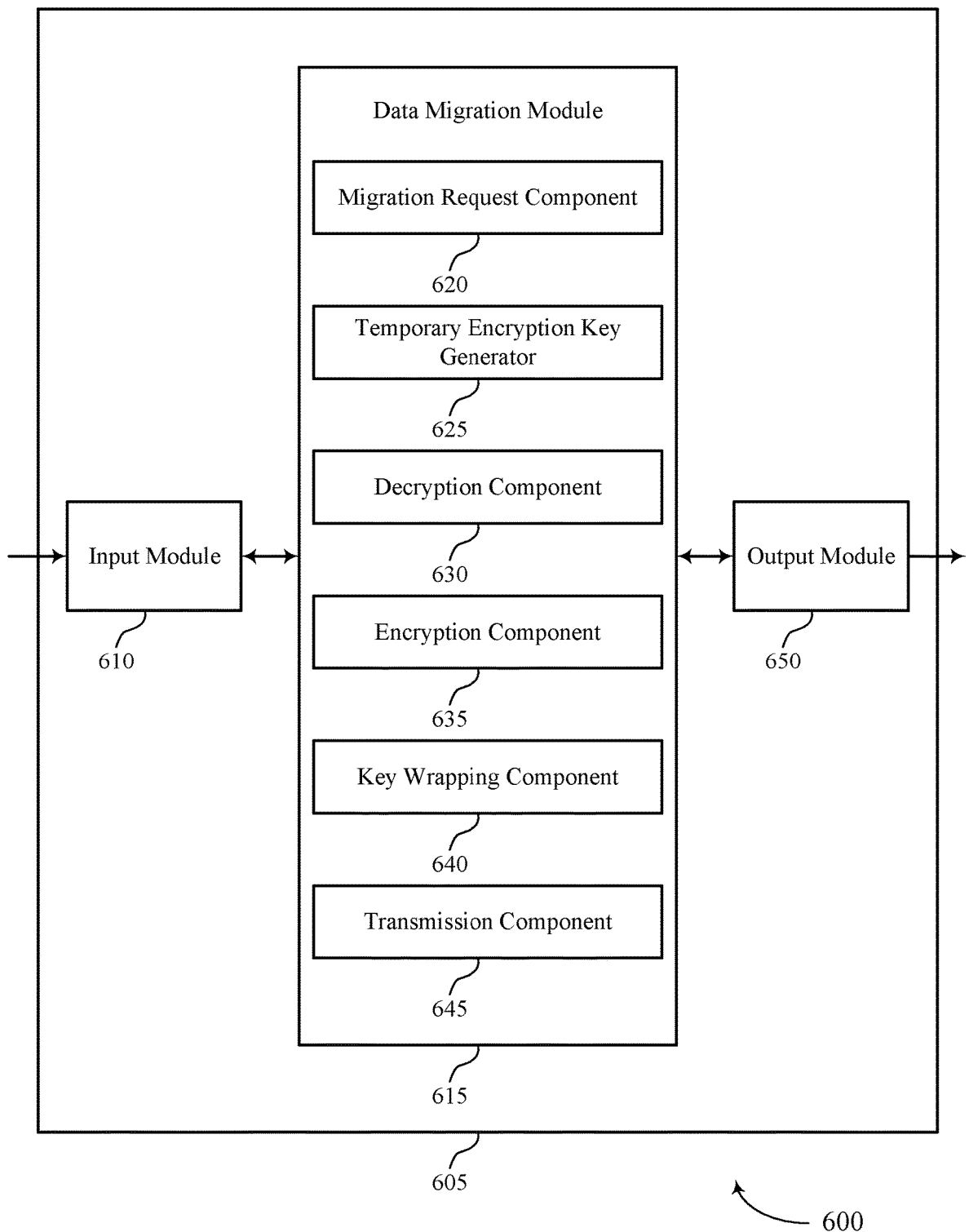
FIG. 6 shows a block diagram of an apparatus that supports migrating data between databases in accordance with aspects of the present disclosure.

FIG. 6 shows a block diagram 600 of an apparatus 605 that supports migrating data between databases in accordance with aspects of the present disclosure. The apparatus 605 may include an input module 610, a data migration module 615, and an output module 650. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data migration module 615 to support migrating data between databases. In some cases, the input module 610 may be a component of an input/output (I/O) controller 815 as described with reference to FIG. 8.

The data migration module 615 may include a migration request component 620, a temporary encryption key generator 625, a decryption component 630, an encryption component 635, a key wrapping component 640, and a transmission component 645. The data migration module 615 may be an example of aspects of the data migration module 705 or 810 described with reference to FIGS. 7 and 8.

The data migration module 615 and/or at least some of its various sub-components may be implemented in hardware, software executed by a processor, firmware, or any combination thereof. If implemented in software executed by a processor, the functions of the data migration module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data migration module 615 and/or at least some of its various sub-components may be physically located at various positions, including being distributed such that portions of functions are implemented at different physical locations by one or more physical devices. In some examples, the data migration module 615 and/or at least some of its various sub-components may be a separate and distinct component in accordance with various aspects of the present disclosure. In other examples, the data migration module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The migration request component 620 may receive, at a first database, a migration request to migrate data from the first database to a second database, where the first database stores data at rest using a first database-specific encryption key and the second database stores data at rest using a second (i.e., different) database-specific encryption key.

The temporary encryption key generator 625 may generate a temporary encryption key for migrating the data from the first database to the second database. The decryption component 630 may decrypt the data using the first database-specific encryption key. The encryption component 635 may re-encrypt the data using the temporary encryption key.

The key wrapping component 640 may wrap the temporary encryption key with a public key for the second database. The transmission component 645 may transmit, to the second database, the re-encrypted data and the wrapped temporary encryption key in response to the migration request.

The output module 650 may manage output signals for the apparatus 605. For example, the output module 650 may receive signals from other components of the apparatus 605, such as the data migration module 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
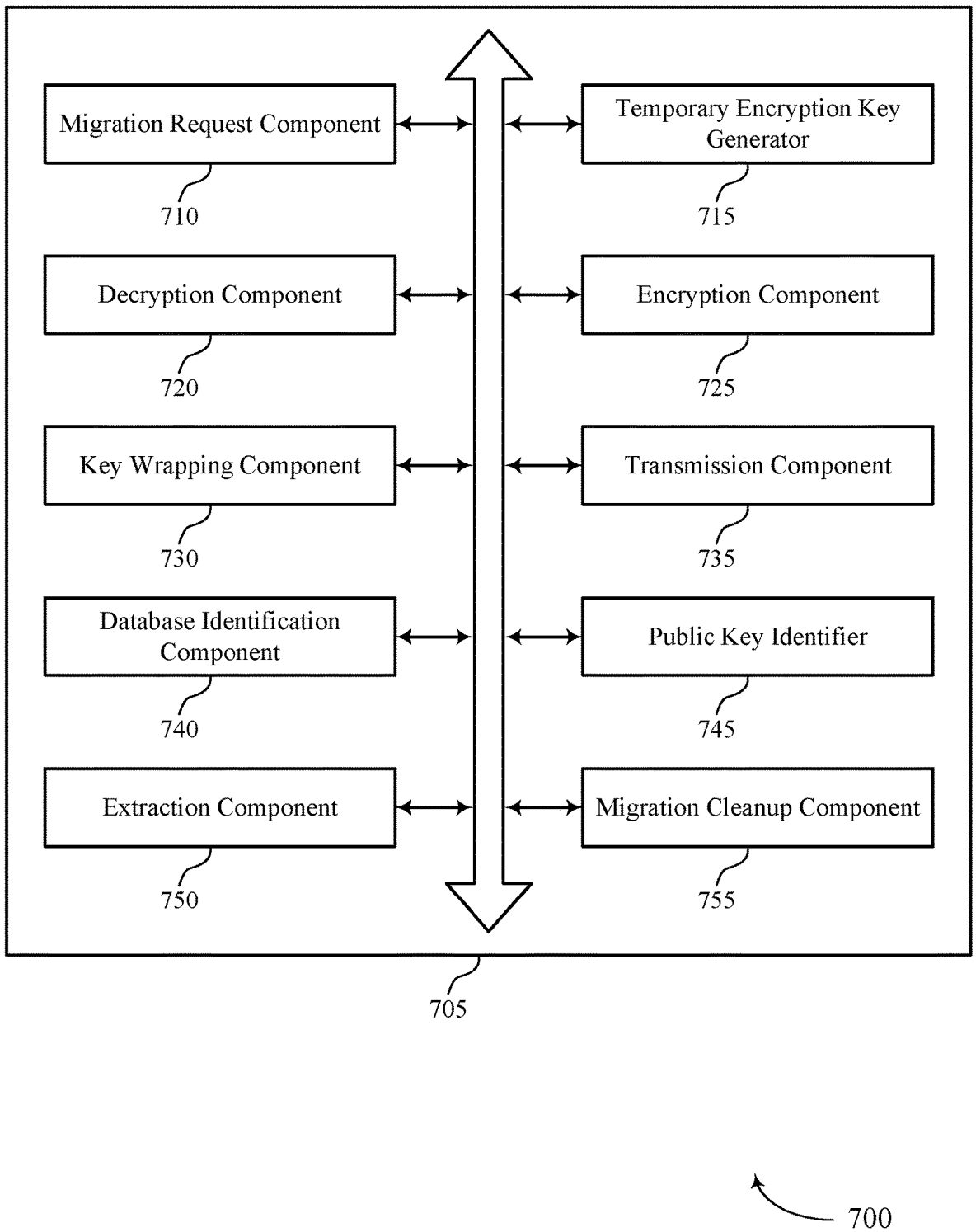
FIG. 7 shows a block diagram of a data migration module that supports migrating data between databases in accordance with aspects of the present disclosure.

FIG. 7 shows a block diagram 700 of a data migration module 705 that supports migrating data between databases in accordance with aspects of the present disclosure. The data migration module 705 may be an example of aspects of a data migration module 615 or a data migration module 810 described herein. The data migration module 705 may include a migration request component 710, a temporary encryption key generator 715, a decryption component 720, an encryption component 725, a key wrapping component 730, a transmission component 735, a database identification component 740, a public key identifier 745, an extraction component 750, a migration cleanup component 755, or any combination of these components. Each of these modules may communicate, directly or indirectly, with one another (e.g., via one or more buses).

The migration request component 710 may receive, at a first database, a migration request to migrate data from the first database to a second database, where the first database stores data at rest using a first database-specific encryption key and the second database stores data at rest using a second database-specific encryption key. In some cases, the migration request corresponds to migrating data for a specific tenant from the first database to the second database. In some examples, receiving the migration request is based on an amount of data for the tenant, a geographic location of the first database or the second database, a data storage policy for the first database or the second database, or a combination thereof. In some cases, the migration request further indicates to migrate additional data from the first database to a third database, and where the third database stores data at rest using a third database-specific encryption key.

The temporary encryption key generator 715 may generate a temporary encryption key for migrating the data from the first database to the second database. In some examples, the temporary encryption key generator 715 may generate an additional temporary encryption key for migrating the additional data from the first database to the third database.

The decryption component 720 may decrypt the data using the first database-specific encryption key. In some examples, the decryption component 720 may decrypt the additional data using the first database-specific encryption key.

The encryption component 725 may re-encrypt the data using the temporary encryption key. In some examples, the encryption component 725 may re-encrypt the additional data using the temporary encryption key. In other examples, the encryption component 725 may re-encrypt the additional data using the additional temporary encryption key.

The key wrapping component 730 may wrap the temporary encryption key with a public key for the second database. In some examples, the key wrapping component 730 may wrap the temporary encryption key with an additional public key for the third database. In other examples, the key wrapping component 730 may wrap the additional temporary encryption key with an additional public key for the third database.

The transmission component 735 may transmit, to the second database, the re-encrypted data and the wrapped temporary encryption key in response to the migration request. In some examples, the transmission component 735 may transmit, to the third database, the re-encrypted additional data and the temporary encryption key wrapped with the additional public key in response to the migration request. In other examples, the transmission component 735 may transmit, to the third database, the re-encrypted additional data and the wrapped additional temporary encryption key in response to the migration request.

The database identification component 740 may identify the second database based on the migration request. The public key identifier 745 may determine the public key that corresponds to the second database based on a database-public key correlation stored in memory of the first database.

The extraction component 750 may extract the data from the first database, where the extracting includes the decrypting the data and deleting the data stored at rest using the first database-specific encryption key at the first database.

The migration cleanup component 755 may receive, at the first database and from the second database, a confirmation message that the data migration is successful. In some examples, the migration cleanup component 755 may delete the data stored at rest using the first database-specific encryption key at the first database.

Figure 8:
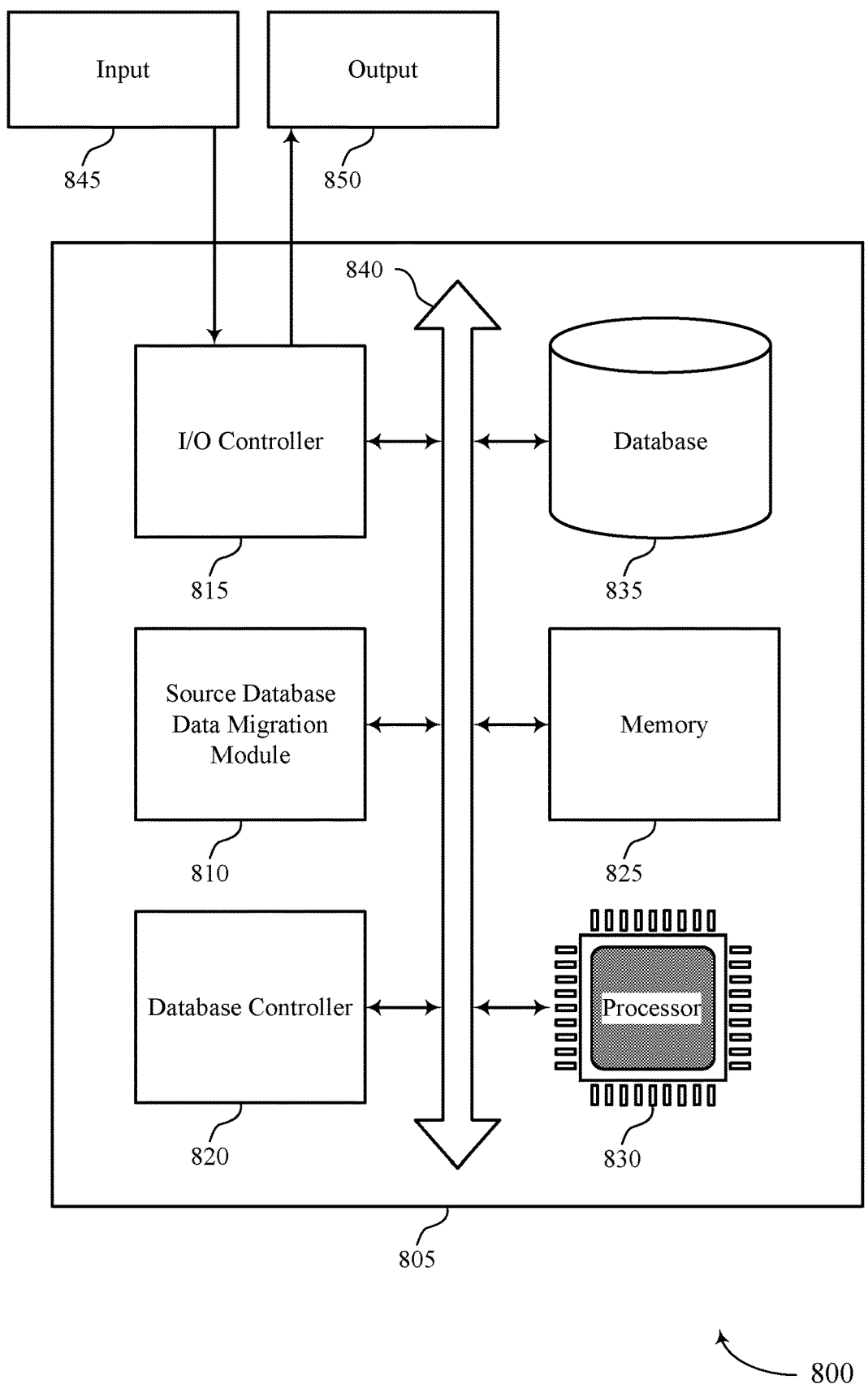
FIG. 8 shows a diagram of a system including a device that supports migrating data between databases in accordance with aspects of the present disclosure.

FIG. 8 shows a diagram of a system 800 including a device 805 that supports migrating data between databases in accordance with aspects of the present disclosure. The device 805 may be an example of or include the components of a source database or an apparatus 605 as described herein. The device 805 may include components for bi-directional data communications including components for transmitting and receiving communications, including a data migration module 810, an I/O controller 815, a database controller 820, memory 825, a processor 830, and a database 835. These components may be in electronic communication via one or more buses (e.g., bus 840).

The data migration module 810 (e.g., a source database data migration module) may be an example of a data migration module 615 or 705 as described herein. For example, the data migration module 810 may perform any of the methods or processes described above with reference to FIGS. 6 and 7. In some cases, the data migration module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include RAM and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting migrating data between databases).

Figure 9:
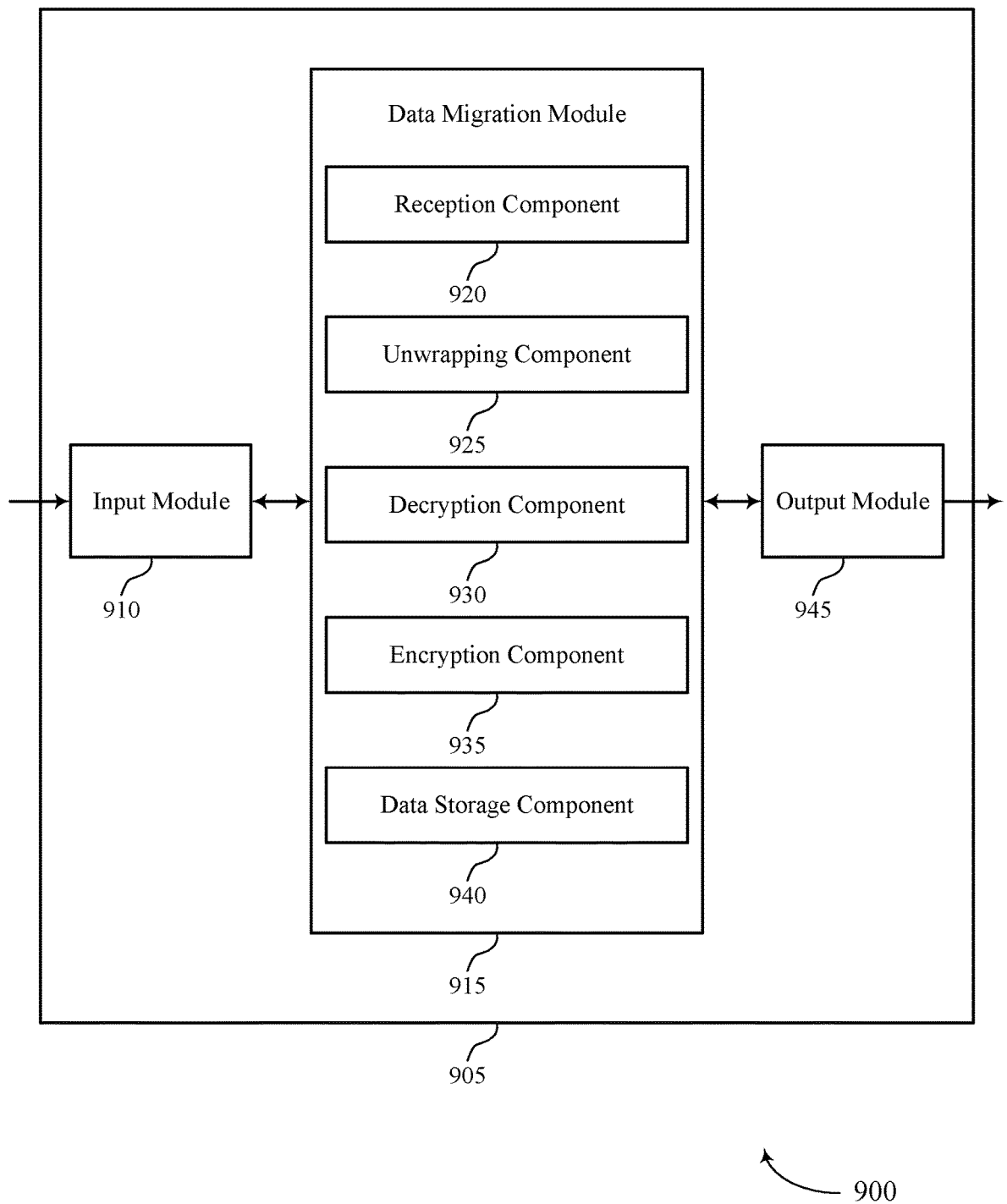
FIG. 9 shows a block diagram of an apparatus that supports migrating data between databases in accordance with aspects of the present disclosure.

FIG. 9 shows a block diagram 900 of an apparatus 905 that supports migrating data between databases in accordance with aspects of the present disclosure. The apparatus 905 may include an input module 910, a data migration module 915, and an output module 945. The apparatus 905 may also include a processor. Each of these components may be in communication with one another (e.g., via one or more buses). In some cases, the apparatus 905 may be an example of a user terminal, a database server, or a system containing multiple computing devices.

The input module 910 may manage input signals for the apparatus 905. For example, the input module 910 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the apparatus 905 for processing. For example, the input module 910 may transmit input signals to the data migration module 915 to support migrating data between databases. In some cases, the input module 910 may be a component of an I/O controller 1115 as described with reference to FIG. 11.

The data migration module 915 may include a reception component 920, an unwrapping component 925, a decryption component 930, an encryption component 935, and a data storage component 940. The data migration module 915 may be an example of aspects of the data migration module 1005 or 1110 described with reference to FIGS. 10 and 11.

The data migration module 915 and/or at least some of its various sub-components may be implemented in hardware, software executed by a processor, firmware, or any combination thereof. If implemented in software executed by a processor, the functions of the data migration module 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The data migration module 915 and/or at least some of its various sub-components may be physically located at various positions, including being distributed such that portions of functions are implemented at different physical locations by one or more physical devices. In some examples, the data migration module 915 and/or at least some of its various sub-components may be a separate and distinct component in accordance with various aspects of the present disclosure. In other examples, the data migration module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The reception component 920 may receive, from a first database and at a second database, encrypted data and a temporary encryption key wrapped with a public key for the second database, where the receiving is based on a migration request. The unwrapping component 925 may unwrap the temporary encryption key using a private key for the second database.

The decryption component 930 may decrypt the encrypted data using the unwrapped temporary encryption key. The encryption component 935 may re-encrypt the encrypted data using a database-specific encryption key for the second database. The data storage component 940 may store, at the second database, the re-encrypted data at rest.

The output module 945 may manage output signals for the apparatus 905. For example, the output module 945 may receive signals from other components of the apparatus 905, such as the data migration module 915, and may transmit these signals to other components or devices. In some specific examples, the output module 945 may transmit output signals for display in a user interface, for storage in a database or data store, for further processing at a server or server cluster, or for any other processes at any number of devices or systems. In some cases, the output module 945 may be a component of an I/O controller 1115 as described with reference to FIG. 11.

Figure 10:
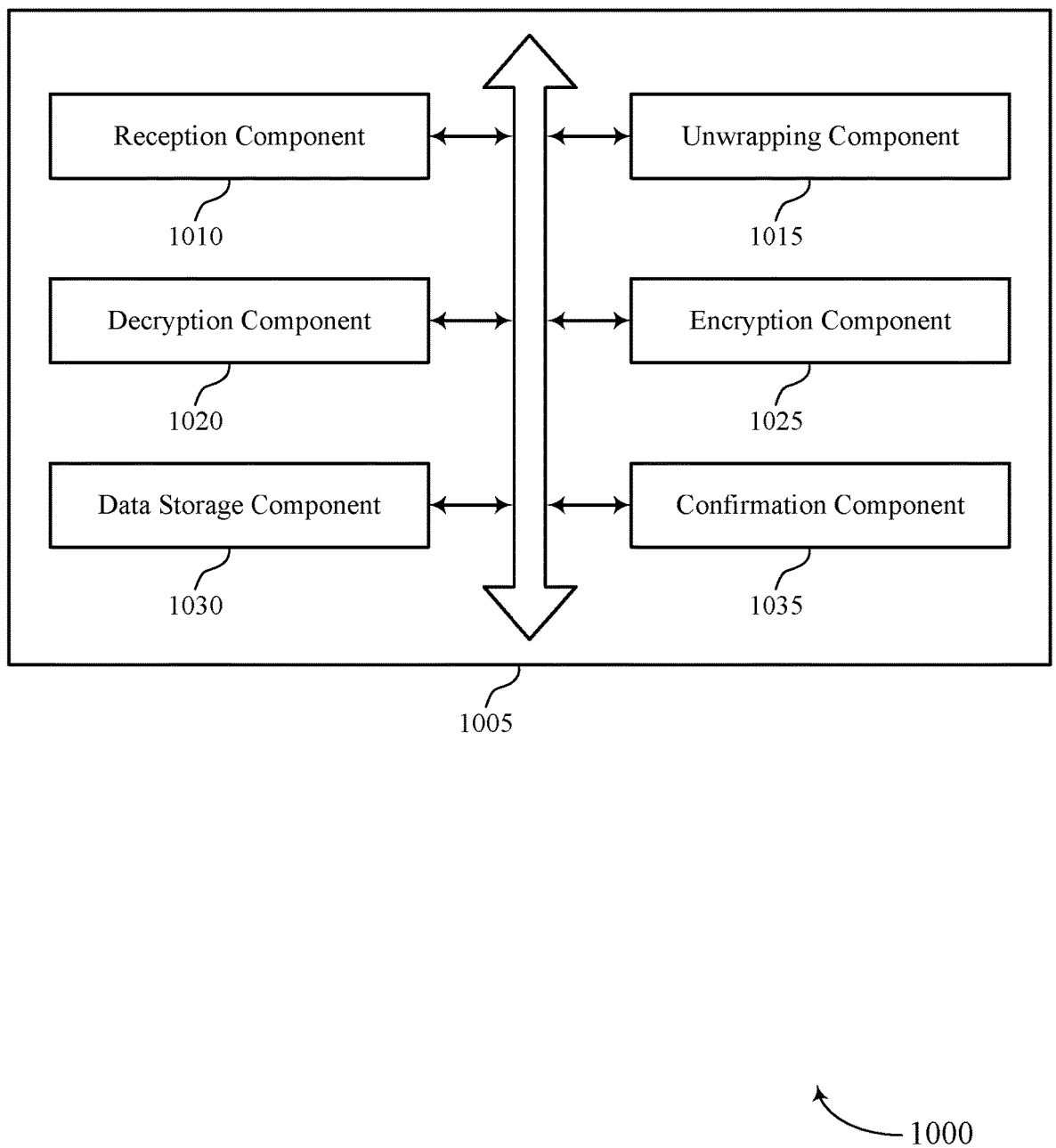
FIG. 10 shows a block diagram of a data migration module that supports migrating data between databases in accordance with aspects of the present disclosure.

FIG. 10 shows a block diagram 1000 of a data migration module 1005 that supports migrating data between databases in accordance with aspects of the present disclosure. The data migration module 1005 may be an example of aspects of a data migration module 915 or a data migration module 1110 described herein. The data migration module 1005 may include a reception component 1010, an unwrapping component 1015, a decryption component 1020, an encryption component 1025, a data storage component 1030, and a confirmation component 1035. Each of these modules may communicate, directly or indirectly, with one another (e.g., via one or more buses).

The reception component 1010 may receive, from a first database and at a second database, encrypted data and a temporary encryption key wrapped with a public key for the second database, where the receiving is based on a migration request. The unwrapping component 1015 may unwrap the temporary encryption key using a private key for the second database.

The decryption component 1020 may decrypt the encrypted data using the unwrapped temporary encryption key. The encryption component 1025 may re-encrypt the encrypted data using a database-specific encryption key for the second database. In some cases, the database-specific encryption key for the second database is different from a database-specific encryption key for the first database.

The data storage component 1030 may store, at the second database, the re-encrypted data at rest. The confirmation component 1035 may transmit, from the second database to the first database, a confirmation message that the data migration is successful.

Figure 11:
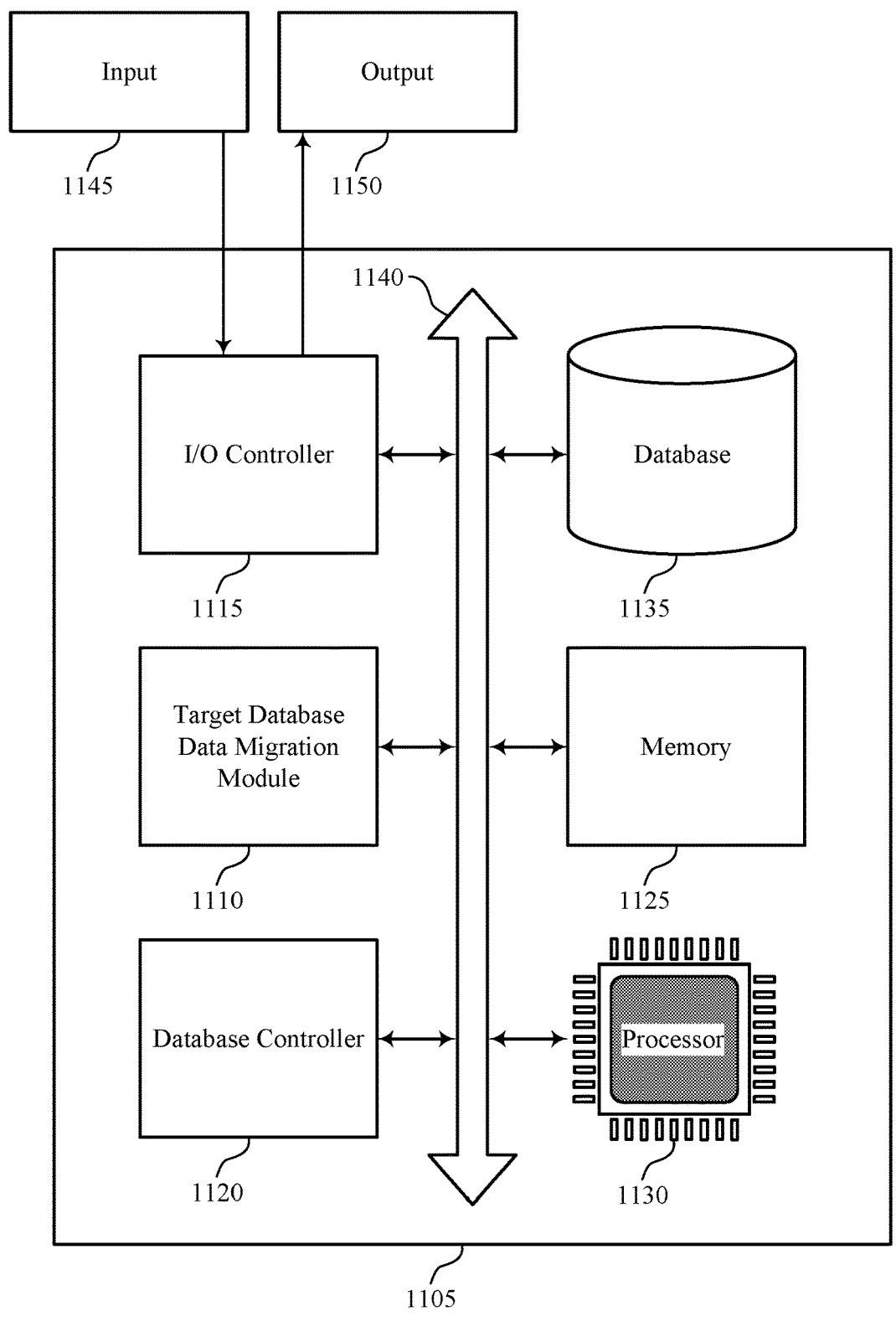
FIG. 11 shows a diagram of a system including a device that supports migrating data between databases in accordance with aspects of the present disclosure.

FIG. 11 shows a diagram of a system 1100 including a device 1105 that supports migrating data between databases in accordance with aspects of the present disclosure. The device 1105 may be an example of or include the components of a target database or an apparatus 905 as described herein. The device 1105 may include components for bi-directional data communications including components for transmitting and receiving communications, including a data migration module 1110, an I/O controller 1115, a database controller 1120, memory 1125, a processor 1130, and a database 1135. These components may be in electronic communication via one or more buses (e.g., bus 1140).

The data migration module 1110 (e.g., a target database data migration module) may be an example of a data migration module 915 or 1005 as described herein. For example, the data migration module 1110 may perform any of the methods or processes described above with reference to FIGS. 9 and 10. In some cases, the data migration module 1110 may be implemented in hardware, software executed by a processor, firmware, or any combination thereof.

The I/O controller 1115 may manage input signals 1145 and output signals 1150 for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The database controller 1120 may manage data storage and processing in a database 1135. In some cases, a user may interact with the database controller 1120. In other cases, the database controller 1120 may operate automatically without user interaction. The database 1135 may be an example of a single database, a distributed database, multiple distributed databases, a data store, a data lake, or an emergency backup database.

Memory 1125 may include RAM and ROM. The memory 1125 may store computer-readable, computer-executable software including instructions that, when executed, cause the processor to perform various functions described herein. In some cases, the memory 1125 may contain, among other things, a BIOS which may control basic hardware or software operation such as the interaction with peripheral components or devices.

The processor 1130 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting migrating data between databases).

Figure 12:
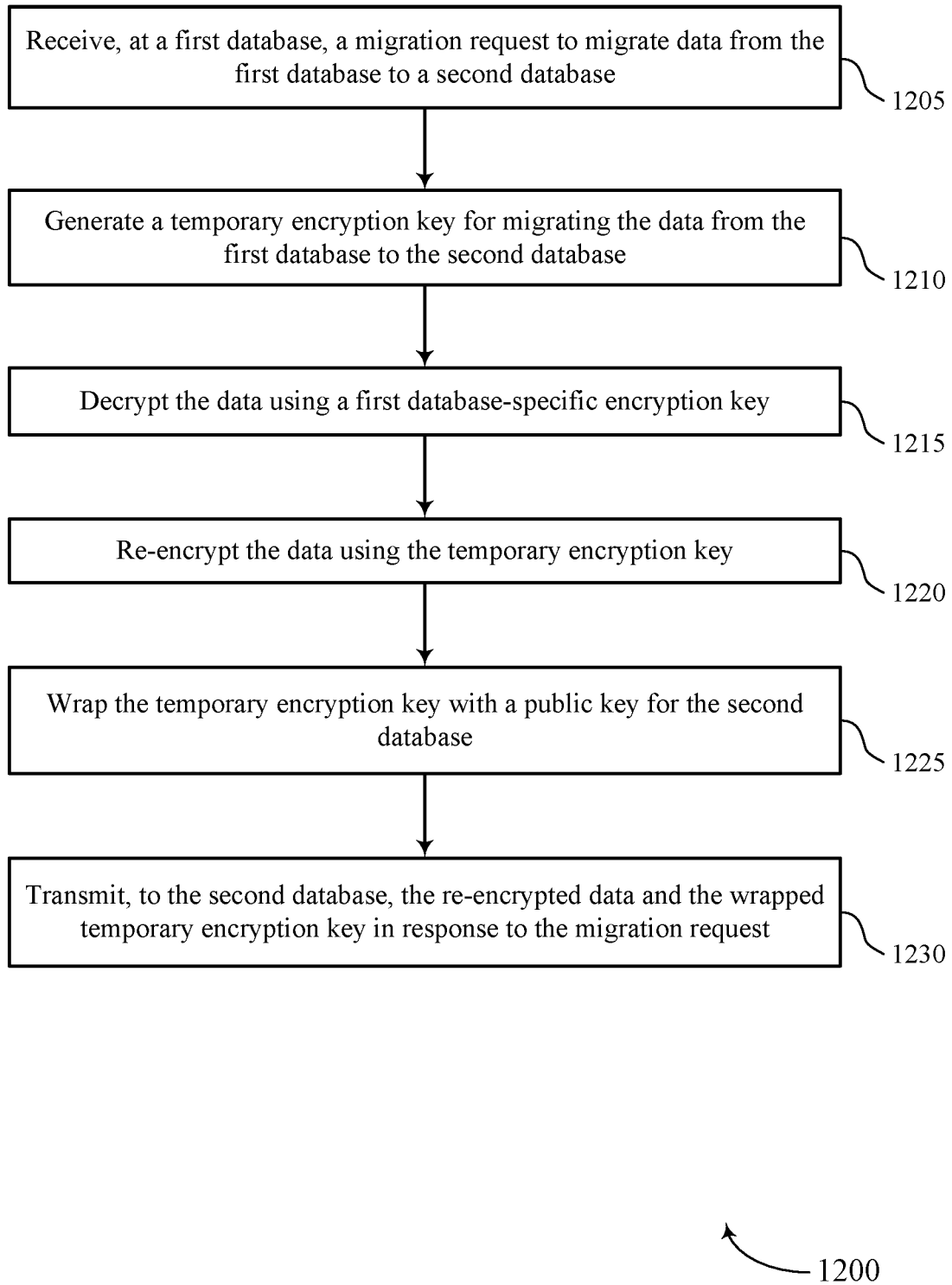
FIGS. 12 through 15 show flowcharts illustrating methods that support migrating data between databases in accordance with aspects of the present disclosure.

FIG. 12 shows a flowchart illustrating a method 1200 that supports migrating data between databases in accordance with aspects of the present disclosure. The operations of method 1200 may be implemented by a source database or its components as described herein. For example, the operations of method 1200 may be performed by a data migration module as described with reference to FIGS. 6 through 8. In some examples, a source database may execute a set of instructions to control the functional elements of the source database to perform the functions described below. Additionally or alternatively, a source database may perform aspects of the functions described below using special-purpose hardware.

At 1205, the source database may receive, at a first database, a migration request to migrate data from the first database to a second database, where the first database stores data at rest using a first database-specific encryption key and the second database stores data at rest using a second database-specific encryption key. The operations of 1205 may be performed according to the methods described herein. In some examples, aspects of the operations of 1205 may be performed by a migration request component as described with reference to FIGS. 6 through 8.

At 1210, the source database may generate a temporary encryption key for migrating the data from the first database to the second database. The operations of 1210 may be performed according to the methods described herein. In some examples, aspects of the operations of 1210 may be performed by a temporary encryption key generator as described with reference to FIGS. 6 through 8.

At 1215, the source database may decrypt the data using the first database-specific encryption key. The operations of 1215 may be performed according to the methods described herein. In some examples, aspects of the operations of 1215 may be performed by a decryption component as described with reference to FIGS. 6 through 8.

At 1220, the source database may re-encrypt the data using the temporary encryption key. The operations of 1220 may be performed according to the methods described herein. In some examples, aspects of the operations of 1220 may be performed by an encryption component as described with reference to FIGS. 6 through 8.

At 1225, the source database may wrap the temporary encryption key with a public key for the second database. The operations of 1225 may be performed according to the methods described herein. In some examples, aspects of the operations of 1225 may be performed by a key wrapping component as described with reference to FIGS. 6 through 8.

At 1230, the source database may transmit, to the second database, the re-encrypted data and the wrapped temporary encryption key in response to the migration request. The operations of 1230 may be performed according to the methods described herein. In some examples, aspects of the operations of 1230 may be performed by a transmission component as described with reference to FIGS. 6 through 8.

Figure 13:
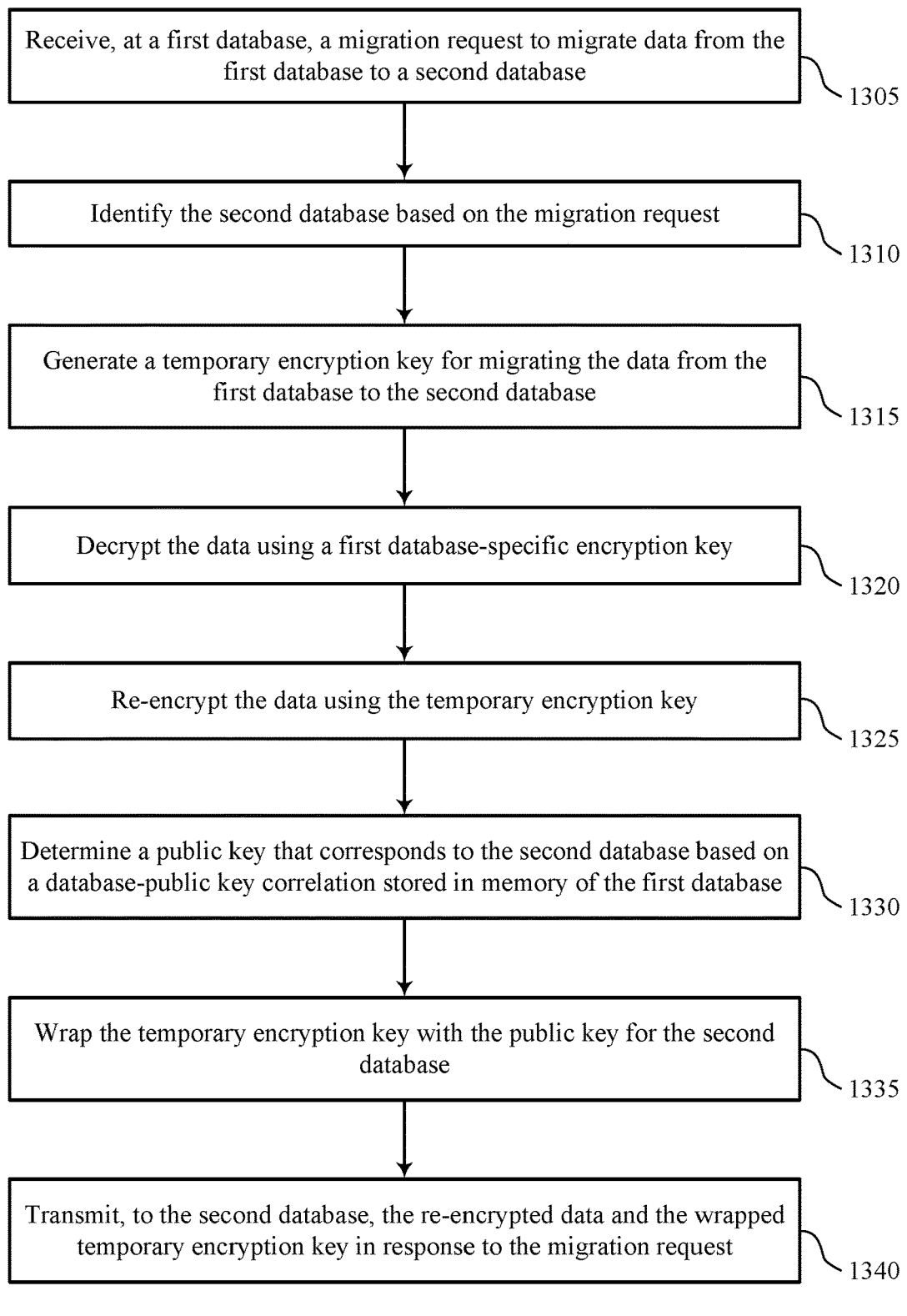

FIG. 13 shows a flowchart illustrating a method 1300 that supports migrating data between databases in accordance with aspects of the present disclosure. The operations of method 1300 may be implemented by a source database or its components as described herein. For example, the operations of method 1300 may be performed by a data migration module as described with reference to FIGS. 6 through 8. In some examples, a source database may execute a set of instructions to control the functional elements of the source database to perform the functions described below. Additionally or alternatively, a source database may perform aspects of the functions described below using special-purpose hardware.

At 1305, the source database may receive, at a first database, a migration request to migrate data from the first database to a second database, where the first database stores data at rest using a first database-specific encryption key and the second database stores data at rest using a second database-specific encryption key. The operations of 1305 may be performed according to the methods described herein. In some examples, aspects of the operations of 1305 may be performed by a migration request component as described with reference to FIGS. 6 through 8.

At 1310, the source database may identify the second database based on the migration request. The operations of 1310 may be performed according to the methods described herein. In some examples, aspects of the operations of 1310 may be performed by a database identification component as described with reference to FIGS. 6 through 8.

At 1315, the source database may generate a temporary encryption key for migrating the data from the first database to the second database. The operations of 1315 may be performed according to the methods described herein. In some examples, aspects of the operations of 1315 may be performed by a temporary encryption key generator as described with reference to FIGS. 6 through 8.

At 1320, the source database may decrypt the data using the first database-specific encryption key. The operations of 1320 may be performed according to the methods described herein. In some examples, aspects of the operations of 1320 may be performed by a decryption component as described with reference to FIGS. 6 through 8.

At 1325, the source database may re-encrypt the data using the temporary encryption key. The operations of 1325 may be performed according to the methods described herein. In some examples, aspects of the operations of 1325 may be performed by an encryption component as described with reference to FIGS. 6 through 8.

At 1330, the source database may determine a public key that corresponds to the second database based on a database-public key correlation stored in memory of the first database. The operations of 1330 may be performed according to the methods described herein. In some examples, aspects of the operations of 1330 may be performed by a public key identifier as described with reference to FIGS. 6 through 8.

At 1335, the source database may wrap the temporary encryption key with the public key for the second database. The operations of 1335 may be performed according to the methods described herein. In some examples, aspects of the operations of 1335 may be performed by a key wrapping component as described with reference to FIGS. 6 through 8.

At 1340, the source database may transmit, to the second database, the re-encrypted data and the wrapped temporary encryption key in response to the migration request. The operations of 1340 may be performed according to the methods described herein. In some examples, aspects of the operations of 1340 may be performed by a transmission component as described with reference to FIGS. 6 through 8.

Figure 14:
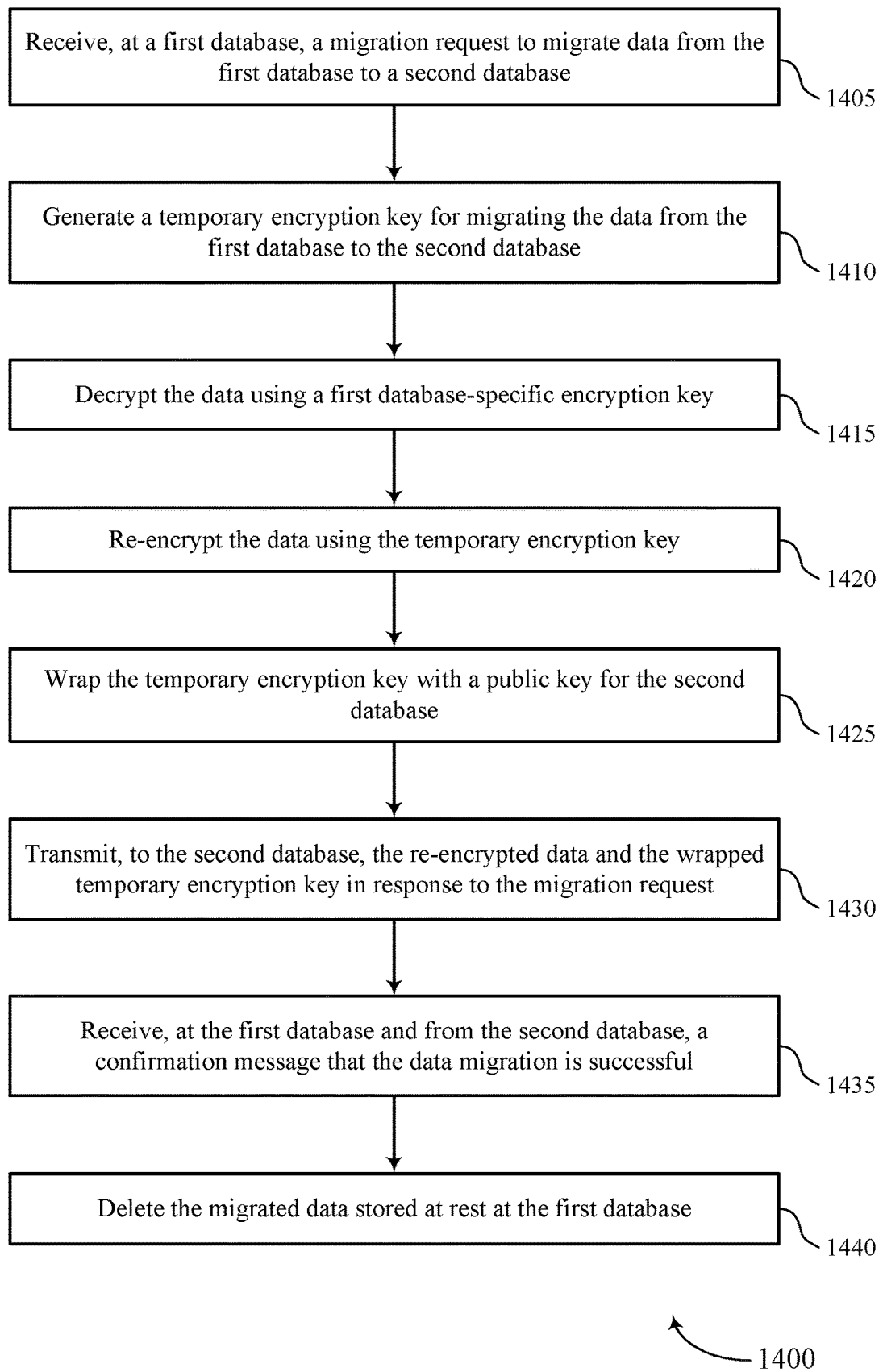

FIG. 14 shows a flowchart illustrating a method 1400 that supports migrating data between databases in accordance with aspects of the present disclosure. The operations of method 1400 may be implemented by a source database or its components as described herein. For example, the operations of method 1400 may be performed by a data migration module as described with reference to FIGS. 6 through 8. In some examples, a source database may execute a set of instructions to control the functional elements of the source database to perform the functions described below. Additionally or alternatively, a source database may perform aspects of the functions described below using special-purpose hardware.

At 1405, the source database may receive, at a first database, a migration request to migrate data from the first database to a second database, where the first database stores data at rest using a first database-specific encryption key and the second database stores data at rest using a second database-specific encryption key. The operations of 1405 may be performed according to the methods described herein. In some examples, aspects of the operations of 1405 may be performed by a migration request component as described with reference to FIGS. 6 through 8.

At 1410, the source database may generate a temporary encryption key for migrating the data from the first database to the second database. The operations of 1410 may be performed according to the methods described herein. In some examples, aspects of the operations of 1410 may be performed by a temporary encryption key generator as described with reference to FIGS. 6 through 8.

At 1415, the source database may decrypt the data using the first database-specific encryption key. The operations of 1415 may be performed according to the methods described herein. In some examples, aspects of the operations of 1415 may be performed by a decryption component as described with reference to FIGS. 6 through 8.

At 1420, the source database may re-encrypt the data using the temporary encryption key. The operations of 1420 may be performed according to the methods described herein. In some examples, aspects of the operations of 1420 may be performed by an encryption component as described with reference to FIGS. 6 through 8.

At 1425, the source database may wrap the temporary encryption key with a public key for the second database. The operations of 1425 may be performed according to the methods described herein. In some examples, aspects of the operations of 1425 may be performed by a key wrapping component as described with reference to FIGS. 6 through 8.

At 1430, the source database may transmit, to the second database, the re-encrypted data and the wrapped temporary encryption key in response to the migration request. The operations of 1430 may be performed according to the methods described herein. In some examples, aspects of the operations of 1430 may be performed by a transmission component as described with reference to FIGS. 6 through 8.

At 1435, the source database may receive, at the first database and from the second database, a confirmation message that the data migration is successful. The operations of 1435 may be performed according to the methods described herein. In some examples, aspects of the operations of 1435 may be performed by a migration cleanup component as described with reference to FIGS. 6 through 8.

At 1440, the source database may delete the data stored at rest using the first database-specific encryption key at the first database. The operations of 1440 may be performed according to the methods described herein. In some examples, aspects of the operations of 1440 may be performed by a migration cleanup component as described with reference to FIGS. 6 through 8.

Figure 15:
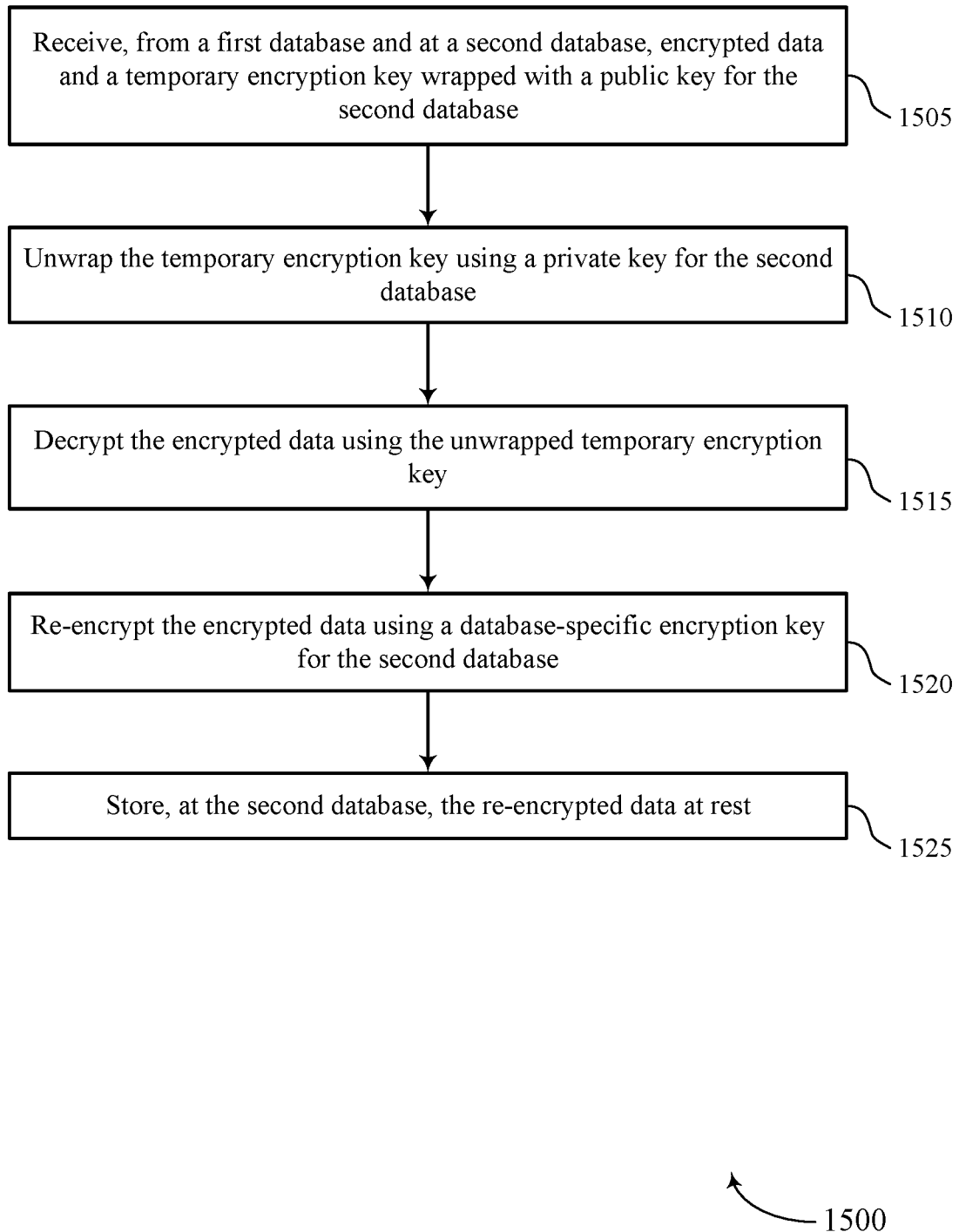

FIG. 15 shows a flowchart illustrating a method 1500 that supports migrating data between databases in accordance with aspects of the present disclosure. The operations of method 1500 may be implemented by a target database or its components as described herein. For example, the operations of method 1500 may be performed by a data migration module as described with reference to FIGS. 9 through 11. In some examples, a target database may execute a set of instructions to control the functional elements of the target database to perform the functions described below. Additionally or alternatively, a target database may perform aspects of the functions described below using special-purpose hardware.

At 1505, the target database may receive, from a first database and at a second database, encrypted data and a temporary encryption key wrapped with a public key for the second database, where the receiving is based on a migration request. The operations of 1505 may be performed according to the methods described herein. In some examples, aspects of the operations of 1505 may be performed by a reception component as described with reference to FIGS. 9 through 11.

At 1510, the target database may unwrap the temporary encryption key using a private key for the second database. The operations of 1510 may be performed according to the methods described herein. In some examples, aspects of the operations of 1510 may be performed by an unwrapping component as described with reference to FIGS. 9 through 11.

At 1515, the target database may decrypt the encrypted data using the unwrapped temporary encryption key. The operations of 1515 may be performed according to the methods described herein. In some examples, aspects of the operations of 1515 may be performed by a decryption component as described with reference to FIGS. 9 through 11.

At 1520, the target database may re-encrypt the encrypted data using a database-specific encryption key for the second database. The operations of 1520 may be performed according to the methods described herein. In some examples, aspects of the operations of 1520 may be performed by an encryption component as described with reference to FIGS. 9 through 11.

At 1525, the target database may store, at the second database, the re-encrypted data at rest. The operations of 1525 may be performed according to the methods described herein. In some examples, aspects of the operations of 1525 may be performed by a data storage component as described with reference to FIGS. 9 through 11.

A method of data migration is described. The method may include receiving, at a first database, a migration request to migrate data from the first database to a second database, where the first database stores data at rest using a first database-specific encryption key and the second database stores data at rest using a second database-specific encryption key. The method may further include generating a temporary encryption key for migrating the data from the first database to the second database, decrypting the data using the first database-specific encryption key, re-encrypting the data using the temporary encryption key, wrapping the temporary encryption key with a public key for the second database, and transmitting, to the second database, the re-encrypted data and the wrapped temporary encryption key in response to the migration request.

An apparatus for data migration is described. The apparatus may include a processor, memory in electronic communication with the processor, and instructions stored in the memory. The instructions may be executable by the processor to cause the apparatus to receive, at a first database, a migration request to migrate data from the first database to a second database, where the first database stores data at rest using a first database-specific encryption key and the second database stores data at rest using a second database-specific encryption key. The instructions may be further executable by the processor to cause the apparatus to generate a temporary encryption key for migrating the data from the first database to the second database, decrypt the data using the first database-specific encryption key, re-encrypt the data using the temporary encryption key, wrap the temporary encryption key with a public key for the second database, and transmit, to the second database, the re-encrypted data and the wrapped temporary encryption key in response to the migration request.

Another apparatus for data migration is described. The apparatus may include means for receiving, at a first database, a migration request to migrate data from the first database to a second database, where the first database stores data at rest using a first database-specific encryption key and the second database stores data at rest using a second database-specific encryption key. The apparatus may further include means for generating a temporary encryption key for migrating the data from the first database to the second database, decrypting the data using the first database-specific encryption key, re-encrypting the data using the temporary encryption key, wrapping the temporary encryption key with a public key for the second database, and transmitting, to the second database, the re-encrypted data and the wrapped temporary encryption key in response to the migration request.

A non-transitory computer-readable medium storing code for data migration is described. The code may include instructions executable by a processor to receive, at a first database, a migration request to migrate data from the first database to a second database, where the first database stores data at rest using a first database-specific encryption key and the second database stores data at rest using a second database-specific encryption key. The code may include further instructions executable by the processor to generate a temporary encryption key for migrating the data from the first database to the second database, decrypt the data using the first database-specific encryption key, re-encrypt the data using the temporary encryption key, wrap the temporary encryption key with a public key for the second database, and transmit, to the second database, the re-encrypted data and the wrapped temporary encryption key in response to the migration request.

In some examples of the method, apparatuses, and non-transitory computer-readable medium described herein, the migration request further indicates to migrate additional data from the first database to a third database, where the third database stores data at rest using a third database-specific encryption key.

Some examples of the method, apparatuses, and non-transitory computer-readable medium described herein may further include operations, features, means, or instructions for decrypting the additional data using the first database-specific encryption key, re-encrypting the additional data using the temporary encryption key, wrapping the temporary encryption key with an additional public key for the third database and transmitting, to the third database, the re-encrypted additional data and the temporary encryption key wrapped with the additional public key in response to the migration request.

Other examples of the method, apparatuses, and non-transitory computer-readable medium described herein may further include operations, features, means, or instructions for generating an additional temporary encryption key for migrating the additional data from the first database to the third database, decrypting the additional data using the first database-specific encryption key, re-encrypting the additional data using the additional temporary encryption key, wrapping the additional temporary encryption key with an additional public key for the third database and transmitting, to the third database, the re-encrypted additional data and the wrapped additional temporary encryption key in response to the migration request.

Some examples of the method, apparatuses, and non-transitory computer-readable medium described herein may further include operations, features, means, or instructions for identifying the second database based on the migration request and determining the public key that corresponds to the second database based on a database-public key correlation stored in memory of the first database.

Some examples of the method, apparatuses, and non-transitory computer-readable medium described herein may further include operations, features, means, or instructions for extracting the data from the first database, where the extracting includes the decrypting the data and deleting the data stored at rest using the first database-specific encryption key at the first database.

Some examples of the method, apparatuses, and non-transitory computer-readable medium described herein may further include operations, features, means, or instructions for receiving, at the first database and from the second database, a confirmation message that the data migration is successful and deleting the data stored at rest using the first database-specific encryption key at the first database.

In some examples of the method, apparatuses, and non-transitory computer-readable medium described herein, the migration request corresponds to migrating data for a specific tenant from the first database to the second database. In some examples of the method, apparatuses, and non-transitory computer-readable medium described herein, receiving the migration request may be based on an amount of data for the tenant, a geographic location of the first database or the second database, a data storage policy for the first database or the second database, or a combination thereof.

Another method of data migration is described. The method may include receiving, from a first database and at a second database, encrypted data and a temporary encryption key wrapped with a public key for the second database, where the receiving is based on a migration request, unwrapping the temporary encryption key using a private key for the second database, decrypting the encrypted data using the unwrapped temporary encryption key, re-encrypting the encrypted data using a database-specific encryption key for the second database, and storing, at the second database, the re-encrypted data at rest.

An apparatus for data migration is described. The apparatus may include a processor, memory in electronic communication with the processor, and instructions stored in the memory. The instructions may be executable by the processor to cause the apparatus to receive, from a first database and at a second database, encrypted data and a temporary encryption key wrapped with a public key for the second database, where the receiving is based on a migration request, unwrap the temporary encryption key using a private key for the second database, decrypt the encrypted data using the unwrapped temporary encryption key, re-encrypt the encrypted data using a database-specific encryption key for the second database, and store, at the second database, the re-encrypted data at rest.

Another apparatus for data migration is described. The apparatus may include means for receiving, from a first database and at a second database, encrypted data and a temporary encryption key wrapped with a public key for the second database, where the receiving is based on a migration request, unwrapping the temporary encryption key using a private key for the second database, decrypting the encrypted data using the unwrapped temporary encryption key, re-encrypting the encrypted data using a database-specific encryption key for the second database, and storing, at the second database, the re-encrypted data at rest.

A non-transitory computer-readable medium storing code for data migration is described. The code may include instructions executable by a processor to receive, from a first database and at a second database, encrypted data and a temporary encryption key wrapped with a public key for the second database, where the receiving is based on a migration request, unwrap the temporary encryption key using a private key for the second database, decrypt the encrypted data using the unwrapped temporary encryption key, re-encrypt the encrypted data using a database-specific encryption key for the second database, and store, at the second database, the re-encrypted data at rest.

Some examples of the method, apparatuses, and non-transitory computer-readable medium described herein may further include operations, features, means, or instructions for transmitting, from the second database to the first database, a confirmation message that the data migration is successful.

In some examples of the method, apparatuses, and non-transitory computer-readable medium described herein, the database-specific encryption key for the second database may be different from a database-specific encryption key for the first database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data migration, comprising:
receiving, at a first database, a migration request corresponding to migrating data for a tenant from the first database to a second database and a third database, wherein the first database stores data at rest using at least a first database-specific encryption key, the second database stores data at rest using a second database-specific encryption key and the third database stores data at rest using a third database-specific encryption key;
generating, in response to receiving the migration request, a common temporary encryption key for the second database and the third database based at least in part on a tenant-specific parameter associated with the tenant;
decrypting the data using the first database-specific encryption key;
re-encrypting the data using the common temporary encryption key;
wrapping the common temporary encryption key with a first public key for the second database and a second public key for the third database;
transmitting, to the second database, the re-encrypted data and the common temporary encryption key wrapped with the first public key; and
transmitting, to the third database, the re-encrypted data and the common temporary encryption key wrapped with the second public key.

2. The method of claim 1, wherein the migration request further indicates to migrate additional data from the first database to the third database.

3. The method of claim 2, further comprising:
decrypting the additional data using the first database-specific encryption key;
re-encrypting the additional data using the common temporary encryption key;
wrapping the common temporary encryption key with an additional public key for the third database; and
transmitting, to the third database, the re-encrypted additional data and the common temporary encryption key wrapped with the additional public key in response to the migration request.

4. The method of claim 2, further comprising:
generating an additional temporary encryption key for migrating the additional data from the first database to the third database;
decrypting the additional data using the first database-specific encryption key;
re-encrypting the additional data using the additional temporary encryption key;
wrapping the additional temporary encryption key with an additional public key for the third database; and
transmitting, to the third database, the re-encrypted additional data and the wrapped additional temporary encryption key in response to the migration request.

5. The method of claim 1, further comprising:
identifying the second database based at least in part on the migration request; and
determining the public key that corresponds to the second database based at least in part on a database-public key correlation stored in memory of the first database.

6. The method of claim 1, further comprising:
extracting the data from the first database, wherein the extracting comprises the decrypting the data and deleting the data stored at rest using the first database-specific encryption key at the first database.

7. The method of claim 1, further comprising:
receiving, at the first database and from the second database, a confirmation message that the data migration is successful; and
deleting the data stored at rest using the first database-specific encryption key at the first database.

8. The method of claim 1, wherein the migration request corresponds to migrating data for a specific tenant from the first database to the second database.

9. The method of claim 8, wherein receiving the migration request is based at least in part on an amount of data for the tenant, a geographic location of the first database or the second database, a data storage policy for the first database or the second database, or a combination thereof.

10. An apparatus for data migration, comprising:
a processor,
memory in electronic communication with the processor; and
instructions stored in the memory and executable by the processor to cause the apparatus to:
receive, at a first database, a migration corresponding to migrating data for a tenant from the first database to a second database and a third database, wherein the first database stores data at rest using at least a first database-specific encryption key, the second database stores data at rest using a second database-specific encryption key and the third database stores data at rest using a third database-specific encryption key;
generate, in response to receiving the migration request, a common temporary encryption key for the second database and the third database based at least in part on a tenant-specific parameter associated with the tenant;
decrypt the data using the first database-specific encryption key;
re-encrypt the data using the common temporary encryption key;
wrap the common temporary encryption key with a first public key for the second database and a second public key for the third database;
transmit, to the second database, the re-encrypted data and the common temporary encryption key wrapped with the first public key; and
transmit, to the third database, the re-encrypted data and the common temporary encryption key wrapped with the second public key.

11. The apparatus of claim 10, wherein the migration request further indicates to migrate additional data from the first database to the third database.

12. The apparatus of claim 11, wherein the instructions are further executable by the processor to cause the apparatus to:
   decrypt the additional data using the first database-specific encryption key;
   re-encrypt the additional data using the common temporary encryption key;
   wrap the common temporary encryption key with an additional public key for the third database; and
   transmit, to the third database, the re-encrypted additional data and the common temporary encryption key wrapped with the additional public key in response to the migration request.

13. The apparatus of claim 11, wherein the instructions are further executable by the processor to cause the apparatus to:
   generate an additional temporary encryption key for migrating the additional data from the first database to the third database;
   decrypt the additional data using the first database-specific encryption key;
   re-encrypt the additional data using the additional temporary encryption key;
   wrap the additional temporary encryption key with an additional public key for the third database; and
   transmit, to the third database, the re-encrypted additional data and the wrapped additional temporary encryption key in response to the migration request.

14. The apparatus of claim 10, wherein the instructions are further executable by the processor to cause the apparatus to:
   identify the second database based at least in part on the migration request; and
   determine the public key that corresponds to the second database based at least in part on a database-public key correlation stored in memory of the first database.

15. The apparatus of claim 10, wherein the instructions are further executable by the processor to cause the apparatus to:
   extract the data from the first database, wherein the extracting comprises the decrypting the data and deleting the data stored at rest using the first database-specific encryption key at the first database.

16. The apparatus of claim 10, wherein the instructions are further executable by the processor to cause the apparatus to:
   receive, at the first database and from the second database, a confirmation message that the data migration is successful; and
   delete the data stored at rest using the first database-specific encryption key at the first database.

\* \* \* \* \*